United States Patent
Das et al.

(10) Patent No.: US 12,019,726 B2
(45) Date of Patent: Jun. 25, 2024

(54) MODEL DISENTANGLEMENT FOR DOMAIN ADAPTATION

(71) Applicant: QUALCOMM Incorporated, San Diego, CA (US)

(72) Inventors: Debasmit Das, San Diego, CA (US); Sungrack Yun, Seongnam (KR); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 17/655,506

(22) Filed: Mar. 18, 2022

(65) Prior Publication Data
US 2023/0297653 A1  Sep. 21, 2023

(51) Int. Cl.
| | | |
|---|---|---|
| G06F 15/16 | (2006.01) |
| G06F 9/54  | (2006.01) |
| G06F 21/32 | (2013.01) |
| G06N 5/022 | (2023.01) |
| H04L 29/06 | (2006.01) |

(52) U.S. Cl.
CPC .............. *G06F 21/32* (2013.01); *G06N 5/022* (2013.01)

(58) Field of Classification Search
CPC ................................ G06F 21/32; G06N 5/022
USPC ......................................................... 726/18
See application file for complete search history.

(56) References Cited

U.S. PATENT DOCUMENTS

| | | | |
|---|---|---|---|
| 2017/0330400 A1* | 11/2017 | Yamamoto Murakami ................. G10L 17/10 |
| 2020/0175095 A1* | 6/2020  | Morariu ................ G06N 3/045 |
| 2021/0150203 A1* | 5/2021  | Liu ........................ G06V 20/56 |
| 2021/0182662 A1* | 6/2021  | Lai ......................... G06F 40/284 |
| 2022/0084371 A1* | 3/2022  | Semichev ............... H04L 63/08 |
| 2022/0101074 A1* | 3/2022  | Peters .................... G06N 3/047 |
| 2022/0108134 A1* | 4/2022  | Marrero .............. G06V 10/764 |
| 2022/0156587 A1* | 5/2022  | Ebrahimpour .......... G06N 3/08 |
| 2022/0164652 A1* | 5/2022  | Aytekin ............... H03M 7/3068 |
| 2022/0329626 A1* | 10/2022 | Sambamoorthy ..... H04L 63/168 |
| 2022/0405580 A1* | 12/2022 | Zheng ................ G06F 18/24147 |
| 2023/0401427 A1* | 12/2023 | Syed Sha ............... G06N 3/045 |

FOREIGN PATENT DOCUMENTS

CN 110163267 A * 8/2019 ........... G06F 17/277

* cited by examiner

*Primary Examiner* — Hamza N Algibhah
(74) *Attorney, Agent, or Firm* — Patterson & Sheridan LLP

(57) ABSTRACT

Certain aspects of the present disclosure provide techniques for improved domain adaptation in machine learning. A feature tensor is generated by processing input data using a feature extractor. A first set of logits is generated by processing the feature tensor using a domain-agnostic classifier, and a second set of logits is generated by processing the feature tensor using a domain-specific classifier. A loss is computed based at least in part on the first set of logits and the second set of logits, where the loss includes a divergence loss component. The feature extractor, the domain-agnostic classifier, and the domain-specific classifier are refined using the loss.

24 Claims, 10 Drawing Sheets

MODEL DISENTANGLEMENT FOR DOMAIN ADAPTATION

INTRODUCTION

Aspects of the present disclosure relate to domain adaptation.

Increasingly, machine learning models have been trained and deployed to perform a wide variety of tasks. Generally, for the trained models to perform accurately, a substantial amount of training data is needed. In many deployments or domains, such ample training data is simply not available or cannot be reasonably obtained. Additionally, training such models generally involves significant computational expense and time.

In some conventional systems, therefore, a generic or universal model is trained based on one or more domains with sufficient training data. For example, a model may be trained to identify or classify handwritten text in input images, using a large number of such images. However, though these models can perform well within the domain for which they are trained, they often fail to provide sufficient accuracy for new (and even closely related) domains. For example, a universal model trained to identify handwritten numerals often fails to perform accurately when exposed to new handwriting samples or to typed samples.

In some conventional systems, therefore, attempts have been made to provide some form of domain adaptation. For example, the model may be refined or fine-tuned using a relatively smaller set of data for the target domain (e.g., the new handwriting samples). Though this can improve model performance, conventional systems have several shortcomings. For example, in many adaptation methods, is it assumed that the source data is available during the refinement. If the entity performing the fine-tuning differs from the entity that trained the original model, this prevents privacy preservation as the fine-tuning entity requires access to the original training data. Similarly, it incurs substantial memory and storage costs on the fine-tuning system. Moreover, during such fine-tuning, the model parameters are generally all modified, regardless of whether they are relevant or useful to the new domain. This can reduce model accuracy substantially.

Accordingly, techniques are needed for improved domain adaptation.

BRIEF SUMMARY

Certain aspects provide a method, comprising: generating a first feature tensor by processing first input data using a feature extractor; generating a first set of logits by processing the first feature tensor using a domain-agnostic classifier; generating a second set of logits by processing the first feature tensor using a domain-specific classifier; computing a first loss based at least in part on the first set of logits and the second set of logits, wherein the first loss includes a first divergence loss component; and refining the feature extractor, the domain-agnostic classifier, and the domain-specific classifier using the first loss.

Certain aspects provide a method, comprising: generating a first feature tensor by processing first input data using a feature extractor; generating a first set of logits by processing the first feature tensor using a domain-agnostic classifier; generating a second set of logits by processing the first feature tensor using a domain-specific classifier; computing a first loss based on the first set of logits and the second set of logits, wherein the first loss includes a second divergence loss component; and fine-tuning at least one of the feature extractor or the domain-specific classifier based on the first loss, wherein the domain-agnostic classifier is fixed during the fine-tuning, and wherein the feature extractor, domain-agnostic classifier, and domain-specific classifier were pre-trained using at least a second input data.

Other aspects provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
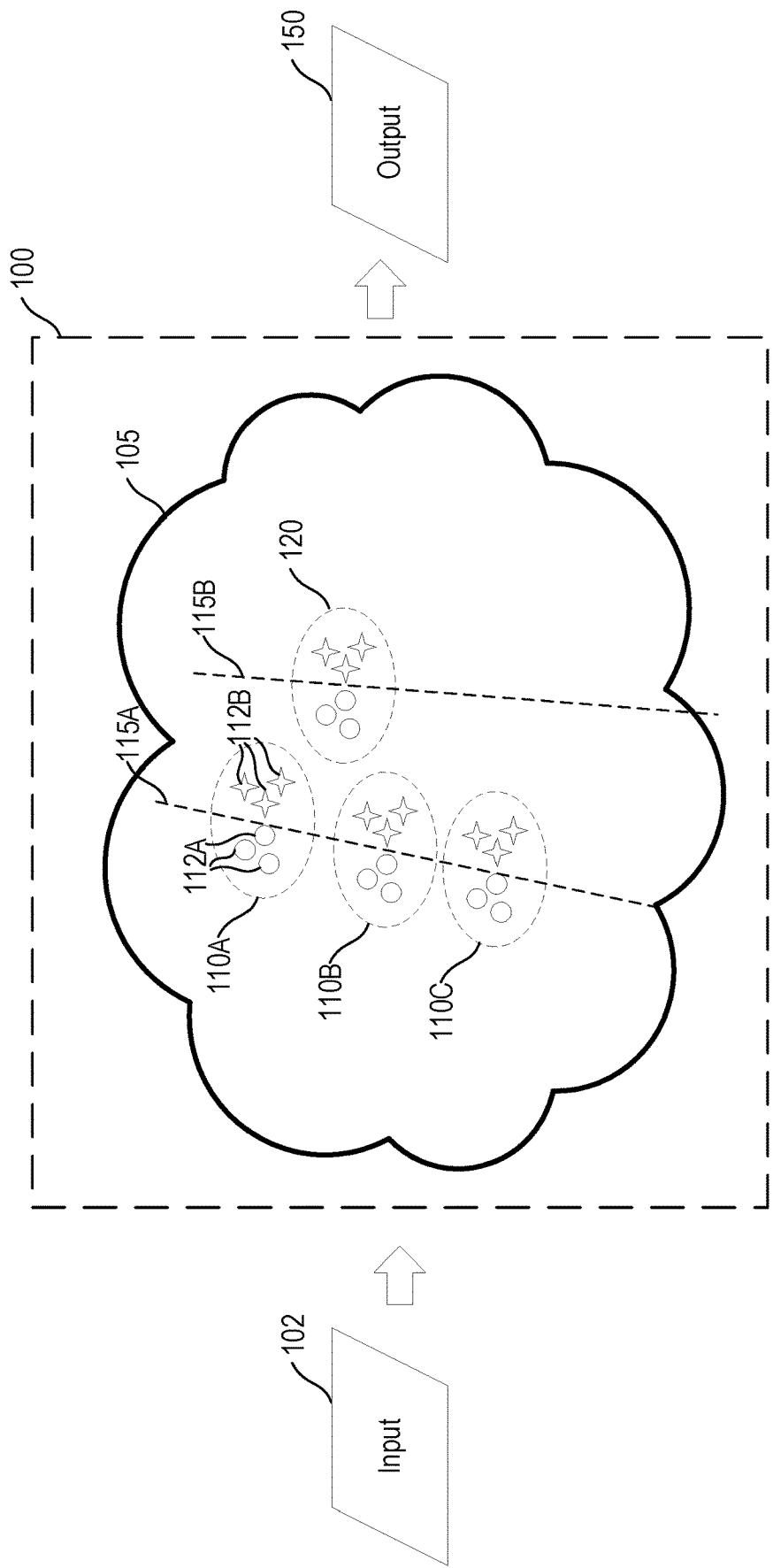
FIG. 1 depicts an example machine learning model trained for domain adaptation according to some aspects of the present disclosure.

Aspects of the present disclosure provide techniques for domain adaptation through model disentanglement. In aspects, domain adaptation can be used to enable a wide variety of improved results, including better user personalization or customization, such as for authentication and/or identification.

In some aspects, during a pre-training phase, a feature extractor (also referred to as a backbone network in some aspects) is trained based on a source domain (e.g., based on training data associated with the original or source domain). During this training, the feature extractor generally learns to generate and/or extract a set of features, based on input data, that are salient to the eventual task (e.g., classification). A domain-agnostic classifier (or regressor, depending on the goal task) and a domain-specific classifier (or regressor) can also be trained based on the source data during this pre-training phase.

Subsequently, during a refinement or fine-tuning stage, the domain-specific classifier, the feature extractor, or both can be fine-tuned based on a target domain (e.g., based on training data associated with the target domain), while the domain-agnostic classifier remains fixed. In some aspects, during the pre-training, fine-tuning, or both, an additional loss component (referred to in some aspects as a divergence loss) is used to cause the features spaces of the domain-agnostic classifier and the domain-specific classifier to diverge or differ as much as possible, as discussed in more detail below. In some aspects, the divergence loss can generally force the classifiers to learn different sets weights that will both accurately classify input to the same output.

In various aspects, during inferencing using the adapted model, a machine learning system may use the domain-agnostic classifier, the domain-specific classifier, or a combination of both, as discussed in more detail below. In some aspects of the present disclosure, various operations and functions are described as being performed by a machine learning system for conceptual clarity. However, in aspects, the various operations described can be performed by any number of devices or systems. For example, a first system may pre-train the models, a second system may fine-tune them, and still a third system may use the models for inferencing.

In aspects, by disentangling the classifier portion(s) of the model from the feature extraction portion(s), and selectively training and fine-tuning each, the models are able to undergo rapid and efficient domain adaptation using relatively little fine-tuning data.

In some aspects, the models discussed herein correspond to neural networks (e.g., deep neural network models). For example, the feature extractor may correspond to one or more initial layers of a neural network, while each classifier corresponds to one or more classification layers. However, aspects of the present disclosure can be readily applied to a wide variety of machine learning architectures.

Additionally, aspects of the present disclosure can be readily applied to a wide variety of tasks. For example, in a fingerprint anti-spoofing system, a domain-agnostic classifier can be trained using fingerprint data for a wide variety of individuals, and a specific classifier can be fine-tuned based on a single individual's fingerprint data, enabling the model to accurately classify real or spoofed fingerprints of the individual.

As another example, for speaker verification, a domain-agnostic classifier can be trained based on data from a group of source users, and a domain-specific classifier can be fine-tuned for a target user based on enrollment data for the user. The model can then be used to classify input voices as belonging to the target user or an imposter or other user.

As yet another example, for image or identity verification, a domain-agnostic classifier can be trained on a variety of biometrics (such as facial data, iris data, handwriting data, and the like), and a domain-specific classifier can be fine-tuned for a target user, as discussed above.

As yet another example, for driver-assistance systems, a domain-agnostic classifier can be trained based on data for a number of users (e.g., the data indicating the level of attention for the users while driving, or whether the user was paying attention), and the domain-specific classifier can be fine-tuned to provide attention verification of a specific target user (e.g., the purchaser of the driver-assistance system).

Generally, by disentangling a domain-specific classifier from a domain-agnostic classifier, aspects of the present disclosure enable universal models to undergo rapid domain adaptation using a relatively small number of training samples. In this way, aspects of the present disclosure domain adaptation that incurs reduced computational expense and reduced storage and memory requirements, while simultaneously improving privacy and protection of the underlying source data (e.g., because the source data is not used during fine-tuning) and enabling accurate models for specific target domains.

Example Domain Adaptation using Machine Learning

FIG. 1 depicts a simplified example machine learning model 100 trained for domain adaptation according to some aspects of the present disclosure.

In the illustrated example, input 102 is provided to a machine learning model 100, which generates a corresponding output 150 based on the task. For example, for a classification task, the output 150 may be a determined (or predicted) class of the input 102. For a regression task, the output 150 may be a continuous value generated based on the input 102. In the illustrated example, for conceptual understanding, a feature space 105 is depicted for the machine learning model 100.

The feature space 105 is generally defined by the set of possible values for feature tensors generated by the machine learning model 100 while processing data. That is, while processing input data, the machine learning model 100 can generate a corresponding multidimensional feature tensor (specifying a value for each of a set of features) to represent the input data 102. This feature tensor can then be processed (e.g., using a classifier or regressor) to perform the desired task, resulting in output 150. In the illustrated aspect, therefore, the feature space 105 corresponds to the set of all possible values for the set of features.

As illustrated, there are several clusters or source domains 110A-C in the feature space 105. Each source domain 110 includes a set of feature tensors 112, each generated based on a corresponding exemplar in the domain 110, with the shape indicating the desired classification of the exemplar or feature tensor 112. That is, the illustrated example task is a classification task, where a feature tensor 112 is generated for each exemplar, and the exemplars are classified based at least in part on the location(s) of these feature tensors 112 in the feature space 105.

In the illustrated example, the machine learning model 100 was trained based on data from the source domains 110A-C, such that a decision boundary 115A is created. The decision boundary 115A delineates the feature space 105 into classifications, such that feature tensors 112 on one side of the boundary are assigned to a first class, and features tensors 112 on the other are assigned to the other class. Although a discrete decision boundary 115A is depicted, it is to be understood that the decision boundary 115A is a visual representation of the classification process for conceptual clarity. Further, in other examples, the decision boundary may be nonlinear and multidimensional.

Figure 2:
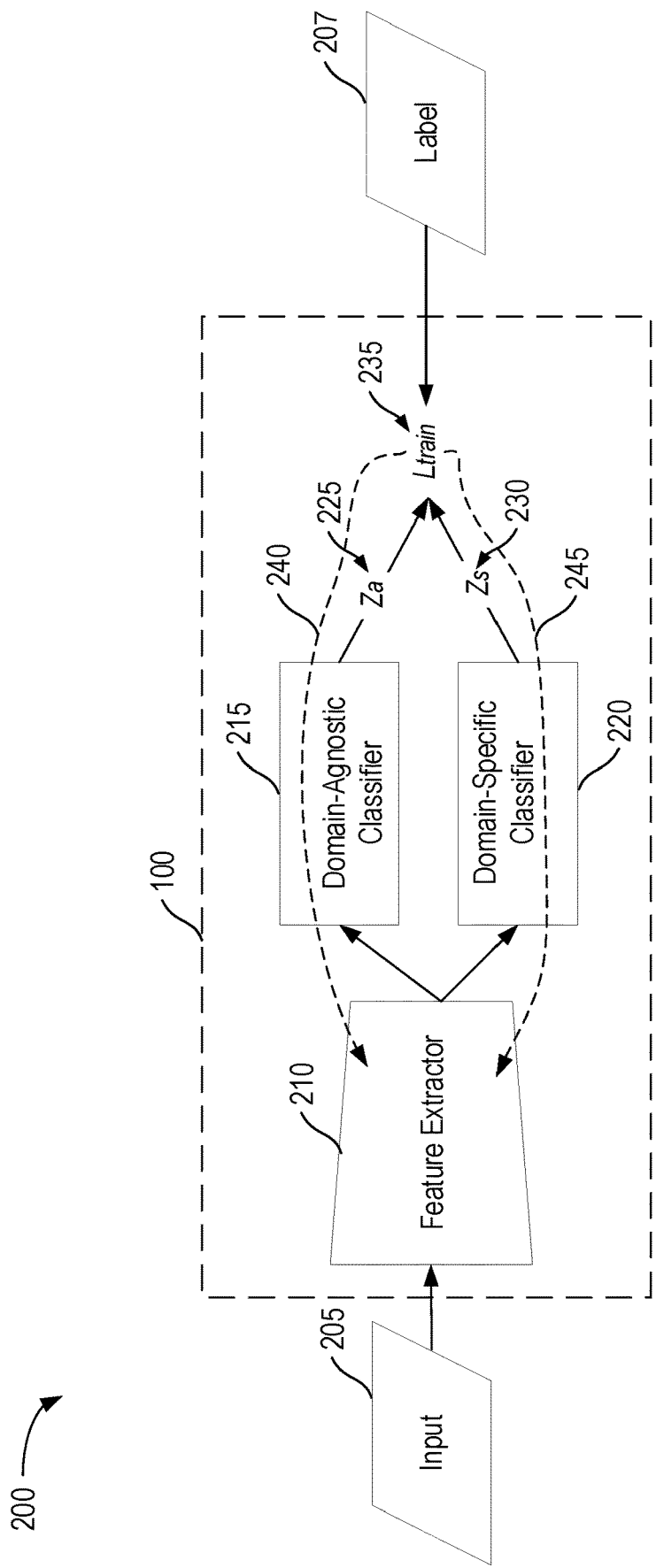
FIG. 2 depicts an example workflow for pre-training a machine learning model.

In the illustrated example, this initial training was performed using a pre-training process that provides model disentanglement, resulting in improved domain adaptation, as discussed in more detail below. For example, FIG. 2 depicts an example workflow to pre-train machine learning models, such as the machine learning model 100.

As illustrated, based on the source training data, the decision boundary 115A delineates the feature tensors 112 into the appropriate categories (e.g., represented for illustrative purposes using circles on the left, and stars on the right). Notably, the decision boundary 115A is arranged such that the exemplars in each domain 110 are properly classified. That is, the decision boundary 115A can classify the feature tensors 112 in any of the source domains 110, as the machine learning model 100 was pre-trained using data from each source domain 110. For example, each source domain 110 may correspond to a particular individual, and the model may be trained to authenticate or validate input (such as fingerprints) as valid (e.g., belonging to the particular individual) or invalid (e.g., as not belonging to the particular individual).

In the illustrated example, the target domain 120 corresponds to a new domain that was not used to train the underlying machine learning model 100. For example, the target domain 120 may correspond to a new individual. As illustrated, though the feature tensors 112 in the target domain are still within the feature space 105, they may not be properly classified by the original decision boundary 115A. Specifically, in the illustrated example, all of the feature tensors 112 in the target domain 120 will be erroneously classified on the "star" side of the decision boundary 115A. Thus, the target domain 120 represents a domain shift, and the machine learning model 100 must be refined or retrained to properly account for the new domain. Although the illustrated example depicts the target domain 120 as entirely on one side of the decision boundary 115A, it is to be understood that the target domain 120 may be partially or entirely overlapping with the boundary and/or the source domains 110.

Figure 3:
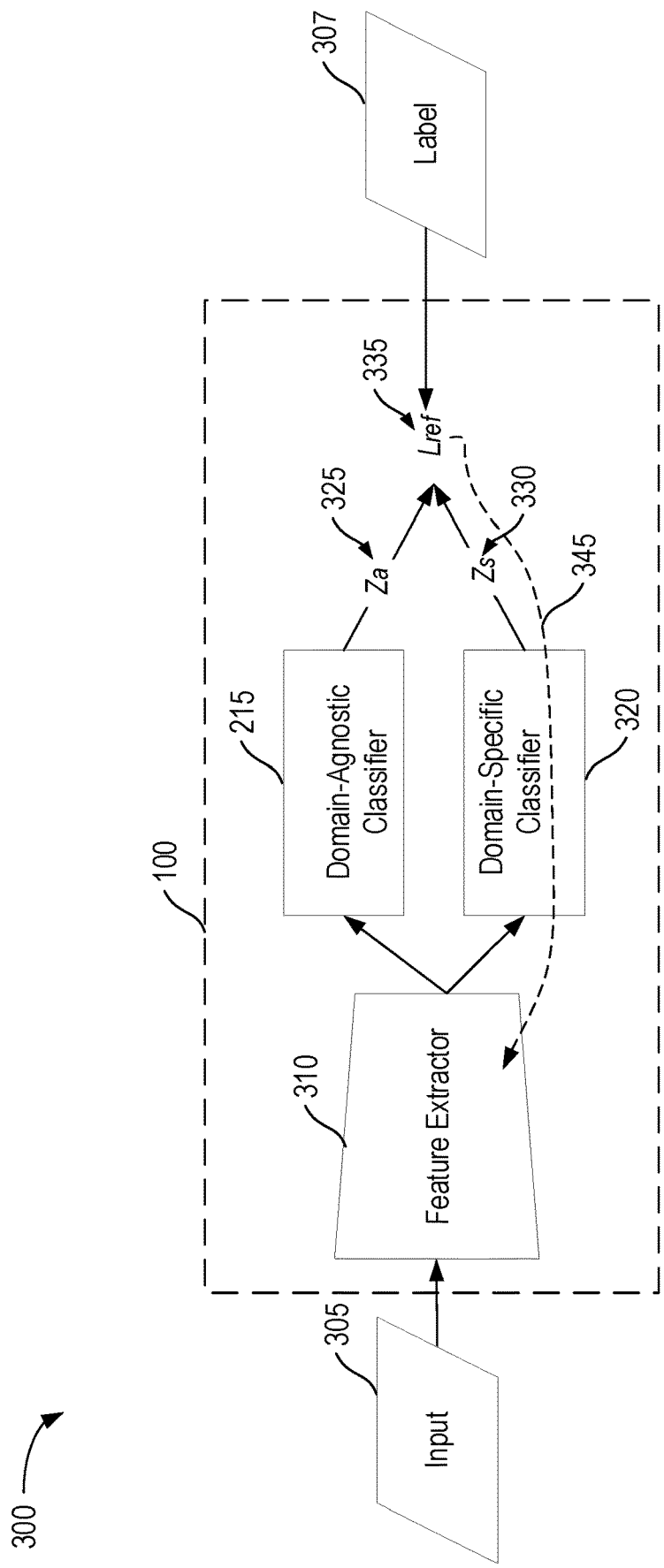
FIG. 3 depicts an example workflow for fine-tuning a machine learning model for domain adaptation to a specific domain.

As illustrated, using various aspects of the present disclosure, the machine learning model 100 can be fine-tuned for the target domain 120. This is reflected by the decision boundary 115B, which indicates the classifications returned by the refined machine learning model 100. In some aspects, as discussed below in more detail, this fine-tuning includes refining a domain-specific classifier for the target domain 120, while keeping a feature extractor fixed. In some aspects, a feature extractor of the model can additionally or alternatively be refined, as discussed below in more detail. FIG. 3 depicts one example workflow for fine-tuning pre-trained models, such as the machine learning model 100.

Advantageously, as discussed above, aspects of the present disclosure enable this fine-tuning of one or more components of the model (e.g., a feature extractor and/or a classifier) to be performed without access to or analysis of the source training data (from the source domains 110).

Once fine-tuned for the target domain 120, as illustrated, the machine learning model 100 can be used to generate inferences (e.g., output 150) to classify input corresponding to the target domain 120. Though the depicted decision boundary 115B suggests that the original source data will be misclassified by the fine-tuned model, in some aspects, the machine learning model 100 may continue to classify these input correctly. That is, the decision boundary may be placed and shaped such that all the feature tensors 112, from both the source domains 110 and the target domain 120, are properly classified. One example workflow for inferencing using a model, such as machine learning model 100, is discussed in more detail below with reference to FIG. 4.

Example Workflow for Pre-Training Machine Learning Models

FIG. 2 depicts an example workflow 200 for pre-training a machine learning model 100. In some aspects, the workflow 200 is performed by a machine learning system, as discussed above.

In various aspects, as discussed above, the pre-training workflow 200 may be performed in any suitable location and by any suitable device or system, and need not be performed on the same system that performs any subsequent fine-tuning. Similarly, as discussed below in more detail, the fine-tuning need not be performed on the same system that performs inferencing using the model. For example, in at least one aspect, a first system (controlled by a first entity, such as an individual, an organization, a company, and the like) may use the workflow 200 to pre-train one or more machine learning models. This model may then be fine-tuned on other systems (e.g., controlled by entities associated with the target domain) for the particular domains of each such target entity (such as by using the workflow 300 of FIG. 3), resulting in a domain-specific model for each such entity. In some aspects, the respective fine-tuned models can then be deployed by these target entities, or by one or more other systems in the target domain, for inferencing (such as by using the workflow 400 of FIG. 4).

The illustrated workflow 200 begins with received input 205. Generally, the characteristics or nature of the input 205 may vary depending on the underlying task. For example, the input 205 may correspond to fingerprint data, facial data, voice data, and the like for various types of authentication and/or identification tasks. In an aspect, the input 205 is used as training data for the machine learning model 100.

In some aspects, the input 205 is associated with a corresponding label 207 indicating the ground-truth output (e.g., a classification for classification tasks, or another value for a regression task). In some aspects, the input 205 is unlabeled, and the machine learning system generates pseudo-labels to use during training, as discussed in more detail below.

As illustrated, the input 205 is provided to a feature extractor 210, which acts as the first stage of the machine learning model 100. Generally, the feature extractor 210 is trained to generate a feature tensor based on the input 205. A feature tensor generally specifies a set of values, one for each of a set of features that can be evaluated to perform the underlying task (e.g., object classification). In some aspects, the feature extractor 210 corresponds to one or more layers of a neural network. In various aspects, the feature extractor 210 may be domain-agnostic (in that it is not fine-tuned for a given target domain) or domain-specific (in that it is fine-tuned in this way), as discussed in more detail below.

In the illustrated aspect, the feature extractor 210 outputs a feature tensor to two subsequent components: a domain-agnostic classifier 215 and a domain-specific classifier 220. Generally, the domain-agnostic classifier 215 and domain-specific classifier 220 are each trained independently to classify the input feature. In some aspects, the domain-agnostic classifier 215 and domain-specific classifier 220 each correspond to one or more layers in a neural network. In aspects, the domain-agnostic classifier 215 and domain-specific classifier 220 may operate in sequence or in parallel. Although the illustrated example depicts classifiers, in other aspects, the architecture may similarly use a domain-agnostic regressor and a domain-specific regressor. Further, other aspects may include any number of domain-specific classifiers or regressors.

As used herein, the term "domain-agnostic" indicates that the component of the model, sub-model, or model is not trained or specialized for a single domain, and can generally operate in a variety of domains. For example, the domain-agnostic classifier 215 may be trained using data from multiple source domains, and can be used to generate inferences in a variety of domains, without being fine-tuned for any particular target domain. The term "domain-specific" indicates that the component or model has been fine-tuned (or is intended to be fine-tuned) for a specific target domain, as discussed in more detail below. As one example, in a fingerprint authentication task, the source domain may correspond to fingerprint data from one or more individuals (used to pre-train the model), and the target domain may correspond to the fingerprints of a specific person.

In the illustrated workflow 200, during the pre-training process, the domain-agnostic classifier 215 and domain-specific classifier 220 are each trained using the same training data (e.g., input 205). As discussed in more detail below with reference to FIG. 3, during a refinement or fine-tuning process, the domain-agnostic classifier 215 can be fixed or frozen (e.g., the weights of the domain-agnostic classifier 215 are not changed or modified), while the domain-specific classifier 220 is refined (e.g., the weights of the domain-specific classifier 220 are modified based on input data for the target domain).

In the illustrated example, the output from each respective classifier is a respective set of logits. Specifically, the domain-agnostic classifier 215 generates domain-agnostic logits 225 (labeled $z_a$), and the domain-specific classifier 220 generates domain-specific logits 230 (labeled $z_s$). In some aspects, each set of logits comprise a vector of raw (e.g., non-normalized) values or normalized values generated by the corresponding classifier. In some aspects, if the logits are raw values, then these vectors may be passed to a normalization function to generate the model output. For example, in a multi-class classification problem, the (raw) logits may be used as input to a softmax function or layer, which generates a vector of (normalized) probabilities with one value for each possible class. Similarly, (raw) logits may be processed by an argmax function or layer, which returns the predicted class (e.g., the class with the highest probability). In some aspects, however, the logits may themselves correspond to an output classification (e.g., the result of an argmax function) and/or to a set of class probabilities (e.g., the result of a softmax function), rather than raw vectors.

In aspects, each classifier generates the logits z by processing the input features f (generated by the feature extractor 210 based on input 205) using a set of learned weights W and/or biases b. For example, the domain-agnostic classifier 215 may be defined using ($W_a$, $b_a$), where $W_a$ is the set of weights for the domain-agnostic classifier, and $b_a$ is the set of biases. In such a formulation, the domain-agnostic logits 225 for the input 205 may be defined using equation 1 below.

$$z_a = W_a * f + b_a \quad (1)$$

Similarly, the domain-specific logits 230 may be defined using equation 2 below, where $W_s$ is the weights of the domain-specific classifier 220 and $b_s$ is the biases of the domain-specific classifier 220.

$$z_s = W_s * f + b_s \quad (2)$$

As illustrated, the domain-agnostic logits 225 and domain-specific logits 230 are used to compute a training loss 235 (labeled $L_{train}$). In some aspects, to generate the training loss 235, the machine learning system can use the domain-agnostic logits 225, as well as a set of aggregated logits including both the domain-agnostic logits 225 and the domain-specific logits 230. For example, in one aspect, the aggregated logits are defined using equation 3 below.

$$z_t = z_a + z_s \quad (3)$$

Although summation is used as one example technique to aggregate the logits, in various aspects, the machine learning system may use other aggregation methods. For example, in some aspects, the machine learning system can concatenate the logits, use a weighted sum, combine the logits using an attention mechanism, and the like. In an aspect, the logits can aggregated and evaluated in the same way regardless of the underlying task (e.g., regardless of whether the model is trained for classification or regression).

In some aspects, the training loss 235 is computed based at least in part on a cross-entropy loss of the domain-agnostic logits 225 and the label 207, as well as cross-entropy loss between the total logits and the label 207. In one aspect, the cross-entropy loss is defined as $L_{CE}(z, y)$, where z is a set of logits generated using input data (e.g., the total logits, the domain-agnostic logits, and the like), and y is the corresponding label for the input that was used to generate the logits. For example, if the input 205 is used to generate the domain-agnostic logits 225, then the ground-truth label 207 (which may be defined as $y_g$) or pseudo-label, as discussed below in more detail, can be used, along with the domain-agnostic logits 225, to generate a domain-agnostic cross-entropy loss $L_{CE}(z_a, y_g)$. One example of cross-entropy loss is given in equation 4 below, where Ind(•) is an indicator function that returns one if the argument is true and zero otherwise, and $z_i$ is the logit of the i-th class.

$$L_{CE} = \Sigma_i \text{Ind}(y=i) \log(\text{softmax}(z_i)) \quad (4)$$

In an aspect, the training loss 235 can include both a domain-agnostic cross-entropy loss $L_{CE}(z_a, y_g)$ as well as a total cross-entropy loss $L_{CE}(z_t, y_g)$ computed based on the total logits $z_t$. In some aspects, the training loss 235 also includes a divergence loss (such as defined below in equation 5) that causes the weights of the domain-agnostic classifier 215 and the domain-specific classifier 220 to diverge or differ. The divergence loss can generally force the domain-agnostic classifier 215 and domain-specific classifier 220 to learn different ways to achieve the same result—accurate predictions. That is, the divergence loss forces the domain-agnostic classifier 215 and domain-specific classifier 220 to learn substantially different sets weights that will both accurately classify the input 205 to the same ground truth label 207.

In one aspect, the divergence loss is an orthonormality loss ($L_{ort}$) defined using equation 5 below, where $W_i = [w_{ai}, w_{si}]$, $w_{ai}$ is weights of the domain-agnostic classifier 215 for class i, $w_{si}$ is weights of the domain-specific classifier for class i, $W_i^T$ is the transpose of $W_i$, and I is an identity matrix with a size that is compatible with or matches the size of $W_i W_i^T$.

$$L_{ort} = \Sigma_i \| I - W_i W_i^T \|^2 \quad (5)$$

In the illustrated workflow 200, the training loss 235 may be a combination of domain-agnostic cross-entropy loss $L_{CE}(\bullet)$ (generated using the domain-agnostic logits 225 and the label 207), a total cross-entropy loss $L_{CE}(\bullet)$ (generated using the total logits and the label 207), and a divergence loss $L_{ort}$ (generated based on the weights of the domain-agnostic classifier 215 and the domain-specific classifier). For example, in one such aspect, the training loss 235 is defined using the equation 6 below, where $\lambda_a$ is a fixed (e.g., a hyperparameter) or learned weight for the domain-agnostic classifier 215 and $\lambda_{ort}$ is a fixed (e.g., a hyperparameter) or learned weight for the divergence loss. In some aspects, larger values of $\lambda_a$ causes the network to focus more on the domain-agnostic portion (and thereby focusing less on the domain-specific portion), while smaller values can cause the network to focus less on the domain-agnostic portion. In either case, disentangling the network can become more difficult if $\lambda_a$ is too large or too small. Additionally, in some aspects, smaller values for $\lambda_{ort}$ may cause the domain-agnostic and the domain-specific portions to be insufficiently orthogonal, which can make adaptation to new domains difficult. Similarly, larger values for $\lambda_{ort}$ can force the model to put less focus on the cross-entropy cask, causing it to focus on the orthogonality and thereby interfering with the original task of classification.

$$L_{train}=L_{CE}(z_p,y)+\lambda_a L_{CE}(z_a,y)+\lambda_{ort}L_{ort} \quad (6)$$

As illustrated by arrows 240 and 245, this training loss 235 is then used to refine the domain-agnostic classifier 215, the domain-specific classifier 220, and the feature extractor 210. That is, during pre-training, all of the components of the machine learning model 100 are iteratively refined based on the training loss 235. For example, in some aspects, the machine learning system uses backpropagation based on the training loss 235 to refine the weights of each classifier by computing weight gradients at each layer, moving from the last layer towards the first. The feature extractor 210 can similarly be refined using backpropagation of the loss through either (or both) classifiers 215 and 220. For example, the gradients from both the domain-specific classifier 220 and the domain-agnostic classifier 215 can be combined and used to update the parameters of the feature extractor 210 during the pre-training workflow 200.

In some aspects, this pre-training workflow 200 may be performed separately for each training sample (e.g., using stochastic gradient descent for each input 205). In other aspects, the workflow 200 may be performed using batches or mini-batches of training samples (e.g., using batch gradient descent on a set of inputs 205). Once the pre-training workflow 200 has completed, the pre-trained machine learning model 100 may be deployed to a particular domain or environment for fine-tuning, discussed in more detail below with reference to FIG. 3.

Example Workflow for Fine-Tuning Machine Learning Models for Domain Adaptation

FIG. 3 depicts an example workflow 300 for fine-tuning a machine learning model for domain adaptation to a specific domain. In one aspect, the fine-tuning workflow 300 is performed subsequent to the pre-training workflow 200 discussed above with reference to FIG. 2. In some aspects, the workflow 300 is performed by a machine learning system, as discussed above.

In various aspects, as discussed above, the fine-tuning workflow 300 may be performed in any suitable location and by any suitable device or system, and need not be performed on the same system that performed the original pre-training. Similarly, as discussed below in more detail, the fine-tuning need not be performed on the same system that performs inferencing using the model. For example, the pre-training process (which generally requires substantial data) may be performed on a relatively powerful device (e.g., a server) while the fine-tuning can be performed on a relatively less-capable device (e.g., a mobile phone, a personal computer, and the like).

The illustrated workflow 300 begins with received input 305. As discussed above, the characteristics or nature of the input 305 may vary depending on the underlying task. In an aspect, the input 305 corresponds to the target domain for the machine learning model 100. That is, while the pre-training process can be done using data from one or more source domains, the fine-tuning workflow 300 uses only data from the target domain.

In some aspects, the input 305 is associated with a corresponding label 307 indicating the ground-truth output (e.g., a classification for classification tasks, or another value for a regression task). In other aspects, the input 305 is unlabeled, and the machine learning system generates pseudo-labels to use during training, as discussed in more detail below.

As illustrated, the input 305 is provided to a feature extractor 310. In some aspects, the feature extractor 310 was pre-trained for one or more source domains using a pre-training process (e.g., using workflow 200 in FIG. 2). The feature extractor 310 may differ from the feature extractor 210 of FIG. 2 in that its internal weights and/or biases may be modified during the refinement process, as discussed below in more detail. Generally, as discussed above, the feature extractor 310 is trained to generate a feature tensor based on the input 305. In the illustrated workflow 300, the generated feature tensor is then provided to two subsequent components: the domain-agnostic classifier 215 (pre-trained using a pre-training process, such as the workflow 200 of FIG. 2) and a domain-specific classifier 320.

In some aspects, the domain-specific classifier 320 was also pre-trained for one or more source domains using a pre-training process (e.g., using workflow 200 in FIG. 2). The domain-specific classifier 320 may differ from the domain-specific classifier 220 of FIG. 2 in that its internal weights and/or biases may be modified during the refinement process, as discussed below in more detail. That is, the domain-specific classifier 320 may correspond to the domain-specific classifier 220 after some fine-tuning is applied.

In the illustrated example, each classifier is used to generate a respective set of logits based on their pre-trained weights and biases, as discussed above. Specifically, the domain-agnostic classifier 215 generates domain-agnostic logits 325 (labeled $z_a$), and the domain-specific classifier 320 generates domain-specific logits 330 (labeled $z_s$).

In the fine-tuning workflow 300, the domain-agnostic logits 325 and domain-specific logits 330 are both used to compute a refinement loss 335 (labeled $L_{ref}$). In some aspects, to generate the refinement loss 335, the machine learning system can use a set of aggregated logits including both the domain-agnostic logits 325 and the domain-specific logits 330. As discussed above, in one aspect, the aggregated logits are defined as $z_{total}=z_a+z_s$. Although summation is used as one example technique to aggregate the logits, in various aspects, the machine learning system may use other aggregation methods. For example, in some aspects, the machine learning system can concatenate the logits, use a weighted sum (with learned or fixed weights), combine the logits using an attention mechanism, and the like.

In at least one aspect, the particular components of the refinement loss 335 may differ depending on whether the ground truth label 307 is available. For example, in some aspects, if there is a ground-truth label 307 (which may be denoted $y_g$), then the refinement loss 335 may be defined using equation 7 below, where $L_{CE}(\bullet)$ is cross-entropy loss, $z_t$ is the aggregated set of logits generated using the input 305 (e.g., a combination of the domain-agnostic logits 325 and the domain-specific logits 330), $y_g$ is the label 307 for the input 305, $\lambda'_{ort}$ is a fixed (e.g., via a hyperparameter) or learned weight for the divergence loss (which may differ from the weight used during pre-training), and $L_{ort}$ is divergence loss (e.g., orthonormality loss, discussed above with reference to FIG. 1).

$$L_{ref} = L_{CE}(z_t, y_g) + \lambda'_{ort} L_{ort} \qquad (7)$$

In some aspects, if no ground-truth label 307 is available (that is, if the input 305 in the target domain is unlabeled), then the machine learning system may use an alternative formulation for the refinement loss 335. In one such aspect, the refinement loss 335 may be defined using equation 8 below, where $L_{IM}$ is an information maximization loss (defined below in equation 9), $\lambda_{pse}$ is a fixed or learned weight for a cross-entropy loss, $L_{CE}(\bullet)$ is cross-entropy loss, $z_t$ is the aggregated set of logits generated using the input 305 (e.g., a combination of the domain-agnostic logits 325 and the domain-specific logits 330), $\hat{y}$ is a pseudo-label for the input 305 (discussed in more detail below), $\lambda'_{ort}$ is a learned or fixed weight for the divergence loss (which may differ from the weight used during pre-training), and $L_{ort}$ is the divergence loss (e.g., defined using orthonormality loss).

$$L_{ref} = L_{IM} + \lambda_{pse} L_{CE}(z_t, \hat{y}) + \lambda'_{ort} L_{ort} \qquad (8)$$

In some aspects, for unlabeled exemplars, the information maximization loss $L_{IM}$ can be calculated by minimizing average entropy (resulting in increased confidence) while maximizing entropy of the average probability distribution (resulting in more diversity). In one such aspect, the information maximization loss is defined using equation 9 below, where $E(\bullet)$ is the expectation (e.g., the arithmetic mean) over samples (e.g., input 305) in the batch, $p_i$ is the probability of the sample belonging to class i (e.g., determined by applying a softmax on the logits generated based on an exemplar in input 305), and $\bar{p}_i$ is the average probability of all samples in the batch, with respect to the class i.

$$L_{IM} = -E(\Sigma_i p_i \log(p_i)) + \Sigma_i \bar{p}_i \log(\bar{p}_i)) \qquad (9)$$

In one aspect, the pseudo-label $\hat{y}$ for a given input 305 is generated in two steps. First, the soft probability outputs of one or both of the classifiers (e.g., the domain-agnostic logits 325 and the domain-specific logits 330) can be used as weights to compute a cluster center for each of the plurality of classes. For example, for a given class, the cluster center of the class can be determined by computing the average probability of the unlabeled input samples with respect to the class. That is, for a given class k, the system can average the probabilities $p_k$ to determine the cluster center of the class.

In an aspect, a nearest-neighbor approach can then be applied to each respective sample (e.g., each exemplar in the input 305) to identify a respective nearest cluster center. The respective nearest cluster center can then be used as the pseudo-label for the respective input sample.

In some aspects, when generating pseudo-labels for the input 305, the clustering is repeated only at defined intervals (rather than for every iteration). That is, the machine learning system may compute a cluster center for each class based on a batch of data, and use these cluster-centers to obtain pseudo-labels for a number of samples (or for a period of time) before re-computing the cluster centers (e.g., periodically, or after a defined number of samples have been thusly labeled) based on a new batch.

Regardless of the particular formulation used to define the fine-tuning loss 335, as illustrated by arrow 345, the refinement loss 335 is then used to refine the domain-specific classifier 320 and/or the feature extractor 310. For example, in some aspects, the machine learning system uses backpropagation based on the training loss 335 to refine the weights and/or biases of the domain-specific classifier 320 by computing weight gradients at each layer, moving from the last layer towards the first. The feature extractor 310 can similarly be refined using backpropagation of the loss through the domain-specific classifier 320. Notably, the parameters of the domain-agnostic classifier 215 remain fixed during the fine-tuning workflow 300.

Generally, the fine-tuning workflow 300 can be performed using significantly fewer samples or exemplars, as compared to the pre-training workflow 200 of FIG. 2. For example, in some aspects, the model can be fine-tuned using as few as one fine-tuning sample per output class. In some aspects, the workflow 300 can be performed with fewer training samples due at least in part to the smaller number of parameters that are being updated. For example, if more parameters (e.g., including both classifiers and the feature extractor) are updated using few samples, the model may overfit to these samples. By updating only a smaller subset of the model (e.g., only the domain-specific classifier), the model can be fine-tuned using little data. Due to the efficient domain adaptation provided using aspects of the present disclosure, the fine-tuning workflow 300 can be used to prepare accurate machine learning models for domains that have severely limited training data (e.g., for fingerprinting a single individual). Further, this efficient fine-tuning allows the models to be specialized on devices with limited computing power, battery capacity, and the like.

In various aspects, the machine learning system can fine-tune only the domain-specific classifier 320 (leaving the feature extractor 310 fixed), fine-tune both the domain-specific classifier 320 and the feature extractor 310, or fine-tune only the feature extractor 310 (leaving the domain-specific classifier 320 fixed). In an aspect, the machine learning system (or a user) can determine which components to fine-tune based at least in part on the number of exemplars are available to refine the machine learning model 100 for the target domain (e.g., the number of inputs 305), whether the target domain exemplars have ground-truth labels 307, and the like.

For example, in one such aspect, the machine learning system (or a user) can determine how many exemplars are available in the target domain, and compare this number to one or more defined thresholds. If there are at least a threshold number of exemplars, then the machine learning system may fine-tune both the domain-specific classifier 320 and the feature extractor 310 based on this input 305. If the number of exemplars in the input 305 is below a threshold, then the machine learning system may fine-tune only the domain-specific classifier 320 (leaving the feature extractor 310 fixed).

Similarly, in one such aspect, the machine learning system may determine whether ground-truth labels 307 are available, or if pseudo-labels need to be generated. If only unlabeled data is available (indicating that pseudo-labels will be used), then the machine learning system may refine only the domain-specific classifier 320 (leaving the feature extractor 310 fixed).

In various aspects, the specific components to be fine-tuned in the workflow 300 may be selected or defined based on a variety of criteria or thresholds (as well as based on the nature of the target domain and source domain(s)), and may be selected in an effort to maximize the resulting model accuracy (e.g., based on prior tests or evaluations of different instances of the machine learning model 100, where each instance had differing components fine-tuned)

In some aspects, the fine-tuning workflow 300 may be performed separately for each training sample (e.g., using stochastic gradient descent for each input 305). In other aspects, the workflow 300 may be performed using batches of training samples (e.g., using batch gradient descent on a set of inputs 305). Once the fine-tuning workflow 300 has completed, the refined or fine-tuned machine learning model 100 may be deployed for inferencing in the target domain or environment, discussed in more detail below with reference to FIG. 4.

Figure 4:
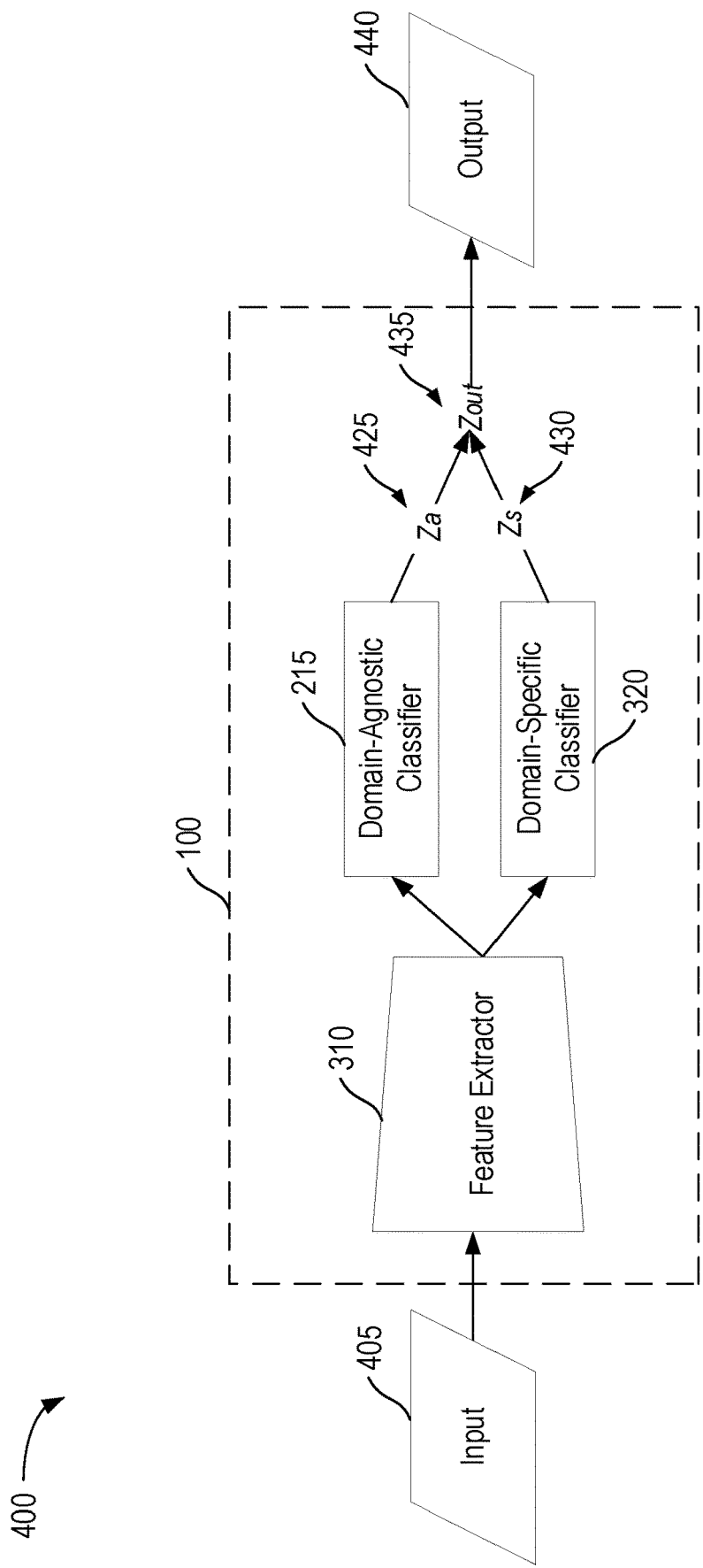
FIG. 4 depicts an example workflow for generating an inference using a machine learning model trained for domain adaptation.

Example Workflow for Generating an Inference using a Machine Learning Model Trained for Domain Adaptation FIG. 4 depicts an example workflow 400 for generating an inference using a machine learning model 100 trained for domain adaptation. In one aspect, the inferencing workflow 400 is performed subsequent to the fine-tuning workflow 300 discussed above with reference to FIG. 3 (and after the pre-training workflow 200 discussed above with reference to FIG. 2). In at least one aspect, if no data is available in the target domain, then the inference workflow 400 can be performed using the pre-trained machine learning model 100 (e.g., trained using the workflow 200 of FIG. 2) without any refinement or fine-tuning.

In some aspects, the workflow 400 is performed by a machine learning system, as discussed above. In various aspects, as discussed above, the inferencing workflow 400 may be performed in any suitable location, and need not be performed on the same system that performed the original pre-training or the fine-tuning.

The illustrated workflow 400 begins with received input 405. As discussed above, the characteristics or nature of the input 405 may vary depending on the underlying task. In an aspect, the input 405 corresponds to the target domain for the machine learning model 100. That is, while the pre-training process can be done using data from one or more source domains, the inferencing workflow 400 is used to process data from the target domain.

As illustrated, the input 405 is provided to the feature extractor 310. In some aspects, the feature extractor 310 which was pre-trained for one or more source domains using a pre-training process (e.g., using workflow 200 in FIG. 2). Additionally, the feature extractor 310 may or may not have been refined for the target domain (e.g., using the fine-tuning workflow 300 in FIG. 3). Generally, as discussed above, the feature extractor 310 is trained to generate a feature tensor based on the input 405. In the illustrated workflow 400, the generated feature tensor is then provided to two subsequent components: the domain-agnostic classifier 215 (pre-trained using a pre-training process, such as the workflow 200 of FIG. 2) and the domain-specific classifier 320 (which was pre-trained, such as using the workflow 200 of FIG. 2, and which may or may not have been refined for the target domain, such as using the workflow 300 of FIG. 3). That is, though the illustrated example depicts a domain-specific classifier 320, in some aspects, this classifier may correspond to domain-specific classifier 220 of FIG. 2 if no fine-tuning was performed.

In the illustrated example, each classifier is used to generate a respective set of logits based on their pre-trained weights and biases, as discussed above. Specifically, the domain-agnostic classifier 215 generates domain-agnostic logits 425 (labeled $z_a$), and the domain-specific classifier 320 generates domain-specific logits 430 (labeled $z_s$).

In the inferencing workflow 400, the domain-agnostic logits 325 and/or the domain-specific logits 330 can be used as an output set logits 435 (labeled $z_{out}$). That is, the output logits 435 may correspond to a combination of both the domain-agnostic logits 425 and the domain-specific logits 430 (e.g., defined by summing, concatenating, computing a weighted sum, combining using an attention mechanism, and the like). In some aspects, if the domain-specific classifier 320 was fine-tuned (e.g., if refinement data was available for the target domain), then the output logits 435 correspond to this aggregated set of logits. That is, after the fine-tuning process, both the domain-agnostic logits 425 and the domain-specific logits 430 may be used to generate output inferences.

In at least one aspect, if the domain-specific classifier 320 was not fine-tuned (e.g., because no fine-tuning data was available), then the machine learning system may use only one set of logits as the output logits 435. That is, the output logits 435 may correspond to the domain-agnostic logits 425, or to the domain-specific logits 430.

As illustrated, an output 440 is determined based on these output logits 435. For example, the machine learning system may identify the class, in the output logits 435, that has the highest probability (e.g., the class with the largest logit), and output this class as the output 440. In some aspects, the output 440 may be generated by processing the output logits 435 using a softmax function (e.g., to generate a normalized probability for each possible class), an argmax function, (e.g., to identify the predicted class), and the like.

Example Method for Pre-Training Machine Learning Models for Domain Adaptation

Figure 5:
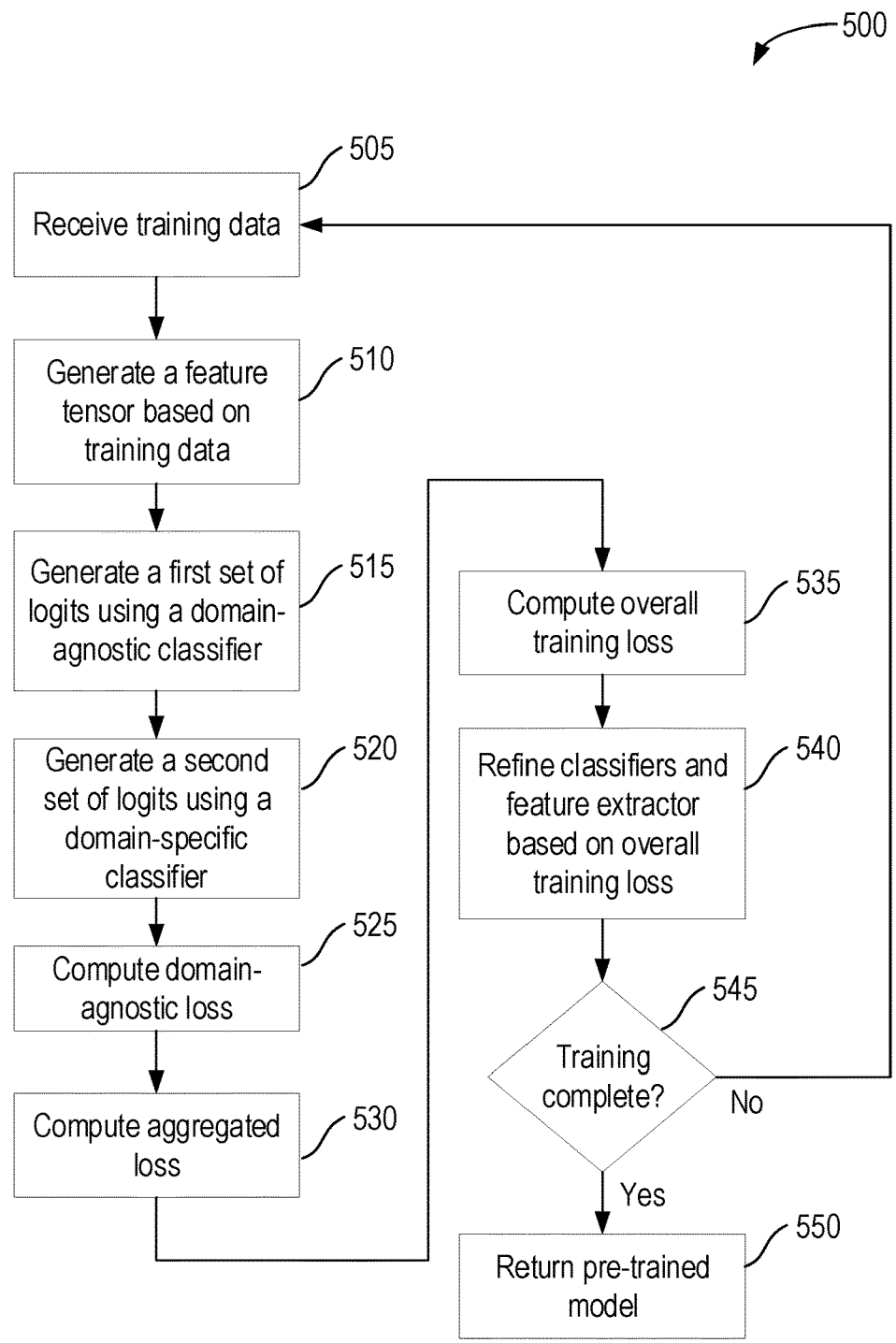
FIG. 5 depicts an example flow diagram illustrating a method for pre-training a machine learning model for domain adaptation.

FIG. 5 depicts an example flow diagram illustrating a method 500 for pre-training a machine learning model for domain adaptation. In some aspects, the method 500 may correspond to the workflow 200 discussed above with reference to FIG. 2. In some aspects, the method 500 is performed by a machine learning system, as discussed above.

The method 500 begins at block 505, where training data is received. In some aspects, the training data corresponds to input data (e.g., input 205 in FIG. 2) used during a pre-training workflow. The training data may correspond to one or more source domains used in the pre-training process. Generally, the training data can be any form, and may or may not include labels, as discussed above. In an aspect, if the training data is labeled with ground-truth classifications or values, then the labels can be used during the training process. If no labels are included, in some aspects, then the machine learning system can generate pseudo-labels, as discussed above.

At block 510, the machine learning system generates a feature tensor based on the received training data. For example, as discussed above, the machine learning system may process the input data using a feature extractor (such as the feature extractor 210 of FIG. 2) to generate a feature tensor representing the input.

At block 515, the machine learning system can then generate a first set of logits using a domain-agnostic classifier. For example, the machine learning system may process the generated feature tensor using one or more layers of a neural network (e.g., corresponding to the domain-agnostic classifier 215 of FIG. 2) to generate a set of logits (e.g., domain-agnostic logits 225 of FIG. 2), where the logits can be used to classify the input data into one of a set of output classes. Although a classification task is described for conceptual clarity, aspects of the present disclosure can be readily applied to regression tasks as well.

At block 520, the machine learning system can similarly generate a second set of logits using a domain-specific classifier. For example, the machine learning system may process the generated feature tensor using one or more layers of a neural network (e.g., corresponding to the domain-specific classifier 220 of FIG. 2) to generate a set of logits (e.g., domain-specific logits 230 of FIG. 2). Although this classifier is referred to as domain-specific, it is initially pre-trained using more generic training data from one or more source domains. It is referred to as domain-specific to denote that it can be or is intended to be refined or fine-tuned for a particular domain, as discussed above.

At block 525, the machine learning system can compute a domain-agnostic loss based on the first set of logits (e.g., the domain-agnostic logits). For example, as discussed above, the machine learning system may compute a cross-entropy loss between the domain-agnostic logits and a ground-truth label for the received training data. In some aspects, as discussed above, the machine learning system may alternatively generate a pseudo-label for the received data, and compute a loss based on this pseudo-label. As discussed above, the domain-agnostic loss may be used to refine the machine learning model.

At block 530, the machine learning system computes an aggregated loss based on the logits. For example, the machine learning system may aggregate the domain-agnostic logits and the domain-specific logits (e.g., using summation, weighted summation, concatenation, an attention mechanism, and the like), and compute a cross-entropy loss using this aggregated set of logits (and a ground truth label or pseudo label), as discussed above.

The method 500 then continues to block 535, where the machine learning system computes an overall training loss for the model. In one aspect, this overall loss is computed based at least in part on the domain-agnostic loss and the aggregated loss (as well as the relevant hyperparameters or weights for each loss component, as discussed above). In some aspects, the overall loss further includes a divergence loss component, as discussed above. For example, as discussed with reference to equations 5 and 6, an orthonormality loss may be computed for inclusion in the total training loss for the model.

At block 540, the machine learning system can then refine the domain-agnostic classifier, domain-specific classifier, and/or feature extractor using the overall training loss. For example, as discussed above, the machine learning system may use backpropagation to refine the weights, biases, or other parameters of each model component. In this way, each component of the machine learning model can iteratively learn to classify input data into the defined output classes.

At block 545, the machine learning system determines whether training is complete. In various aspects, this may include evaluation of any number of termination criteria. For example, the machine learning system may determine whether additional training samples remain, whether a maximum amount of time (or a maximum amount of computing resources) has been expended training, whether a defined number of epochs have passed, and the like.

If training is not complete, the method 500 returns to block 505 to receive or select the next training data. If training is complete, then the method 500 continues to block 550, where the pre-trained model is returned (e.g., for storage, for deployment, for fine-tuning, and the like). Although the illustrated example depicts refining the model using a single training instance for conceptual clarity, in various aspects, the training may be performed in a batch learning process, in a mini-batch learning process, as an online learning process, and the like.

Note that FIG. 5 is just one example of a method, and other methods including fewer, additional, or alternative steps are possible consistent with this disclosure.

Example Method for Fine-Tuning Machine Learning Models for Domain Adaptation

Figure 6:
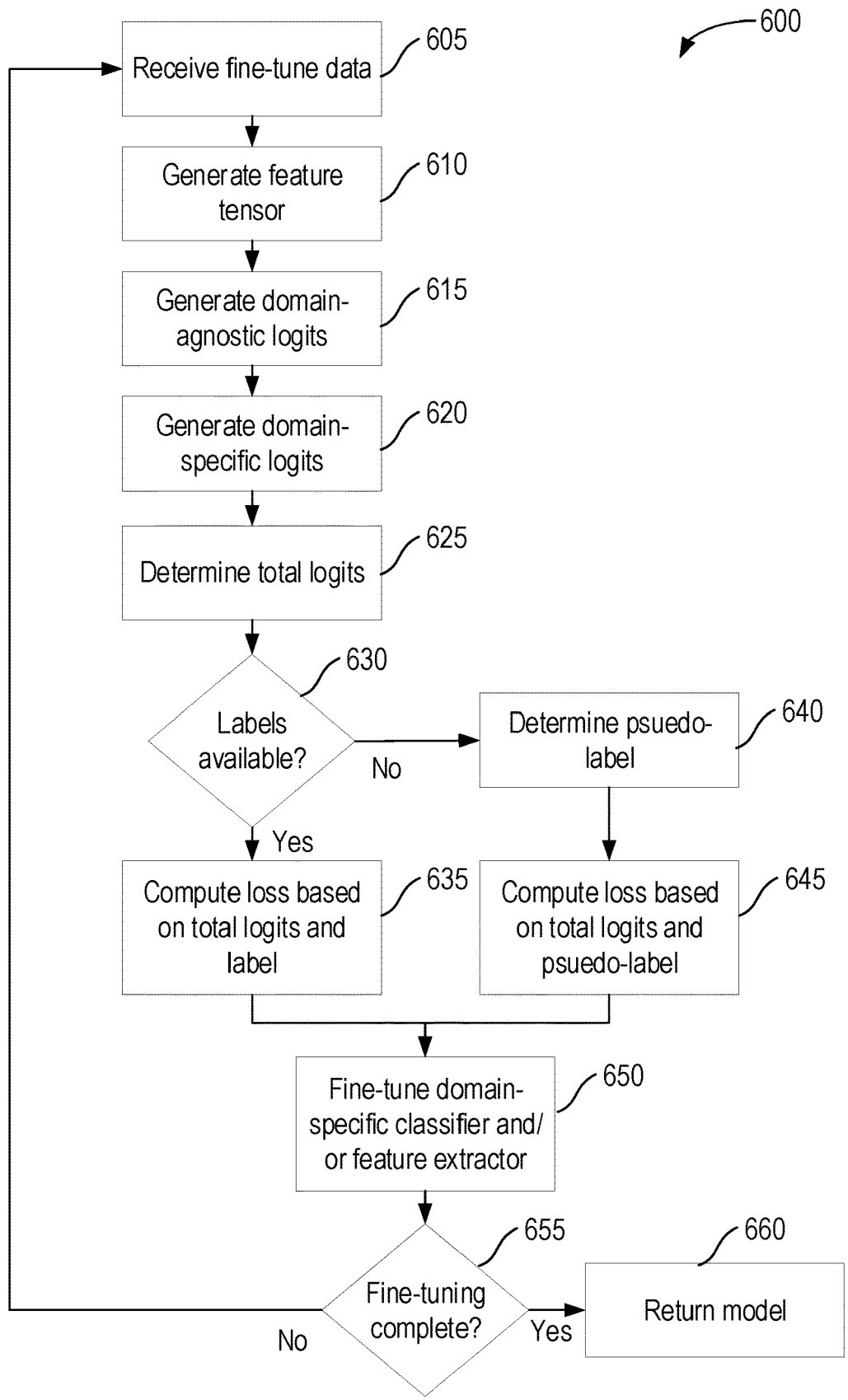
FIG. 6 depicts an example flow diagram illustrating a method for fine-tuning a machine learning model for domain adaptation to a specific domain.

FIG. 6 depicts an example flow diagram illustrating a method 600 for fine-tuning a machine learning model for domain adaptation to a specific domain. In some aspects, the method 600 may correspond to the workflow 300 discussed above with reference to FIG. 3.

The method 600 begins at block 605, where a machine learning system receives fine-tuning data. As discussed above, the fine-tuning data may generally correspond to data from a target domain, to be used to train, refine, or fine-tune a model for the target domain. For example, the fine-tuning data may correspond to input 305 of FIG. 3.

At block 610, the machine learning system generates a feature tensor based on the received fine-tuning data. For example, as discussed above, the machine learning system may process the input data using a feature extractor (such as the feature extractor 210 of FIG. 3) to generate a feature tensor representing the input.

At block 615, the machine learning system can then generate a set of domain-agnostic logits using a domain-agnostic classifier. For example, the machine learning system may process the generated feature tensor using one or more layers of a neural network (e.g., corresponding to the domain-agnostic classifier 215 of FIG. 3) to generate a set of logits (e.g., domain-agnostic logits 325 of FIG. 3), where the logits can be used to classify the input data into one of a set of output classes. Although a classification task is described for conceptual clarity, aspects of the present disclosure can be readily applied to regression tasks as well.

At block 620, the machine learning system can similarly generate a set of domain-specific logits using a domain-specific classifier. For example, the machine learning system may process the generated feature tensor using one or more layers of a neural network (e.g., corresponding to the domain-specific classifier 320 of FIG. 3) to generate a set of logits (e.g., domain-specific logits 330 of FIG. 3).

The method 600 then continues to block 625, where the machine learning system determines the set of total logits based on the domain-specific logits and the domain-agnostic logits. For example, as discussed above, the machine learning system may aggregate the domain-specific logits and the domain-agnostic logits using summation, weighted summation, concatenation, an attention mechanism, and the like.

At block 630, the machine learning system determines whether label(s) are available for the fine-tuning data. In some aspects, though there may be ample labeled training data in the source domain(s), the target domain may lack this data (e.g., there may be significantly less data in the target domain, and/or the data may be unlabeled).

If labels are available for the fine-tuning data, the method 600 continues to block 635, where the machine learning system computes a loss based on the total logits and the corresponding label for the received fine-tuning data. For example, the machine learning system may compute the refinement or fine-tuning loss based on a cross-entropy loss between the total logits and the label ground-truth. In some aspects, the machine learning system may also include a divergence loss in this total loss, such as orthonormality loss, as discussed above. In at least one aspect, the loss generated at block 635 is computed using equation 7. In some aspects, as discussed above, the loss is generated based in part on the relevant hyperparameters or weights for each loss component. The method 600 then continues to block 650.

Returning to block 630, if the fine-tuning data does not have a label, then the method 600 continues to block 640. At block 640, the machine learning system determines or generate a pseudo-label for the fine-tuning data. For example, as discussed above, the machine learning system may compute cluster centers for each of the set of classes based on the output logits for multiple training samples, and then determine, for each training sample, the closest cluster based on that sample's logits. The class of this nearest cluster can then be used as the pseudo-label for the fine-tuning sample.

At block 645, the machine learning system then computes the loss based on the total logits and the generated pseudo-label. For example, the machine learning system may compute the fine-tuning loss based on a cross-entropy loss between the total logits and the pseudo-label. In some aspects, the machine learning system may also include an information maximization loss, such as the loss discussed above with reference to equation 9. Additionally, in some aspects, the machine learning system may also include a divergence loss, such as an orthonormality loss, as discussed above. In at least one aspect, the loss generated in block 645 is computed using equation 8, discussed above. The method 600 then continues to block 650.

At block 650, the machine learning system fine-tunes the domain-specific classifier and/or the feature extractor based on the computed loss. In an aspect, the domain-agnostic classifier is fixed during this fine-tuning. In some aspects, as discussed above, the machine learning system may determine whether to fine-tune solely the domain-specific classifier, solely the feature extractor, or both the domain-specific classifier and the feature extractor, based on a variety of characteristics of the fine-tuning data or domain. For example, the machine learning system may fine-tune both if a sufficient number of labeled training samples are available, fine-tune only the domain-specific classifier if the fine-tuning data is unlabeled, and the like.

The method 600 then continues to block 655, where the machine learning system determines whether the fine-tuning is complete. In various aspects, this may include evaluation of any number of termination criteria. For example, the machine learning system may determine whether additional fine-tuning samples remain, whether a maximum amount of time (or a maximum amount of computing resources) has been expended fine-tuning, whether a defined number of epochs have passed, and the like.

If fine-tuning is not complete, the method 600 returns to block 605 to receive or select the next fine-tuning data. If fine-tuning is complete, then the method 600 continues to block 660, where the fine-tuned model is returned (e.g., for storage, for deployment, and the like). Although the illustrated example depicts refining the model using a single training instance for conceptual clarity, in various aspects, the fine-tuning may be performed in a batch learning process, in a mini-batch learning process, as an online learning process, and the like.

As discussed above, in some aspects, the method 600 can be performed using relatively scant training data (as compared to the original pre-training), which can allow the method 600 to be performed on different devices with lower power (e.g., lower computational power, memory capacity, battery or energy capacity, and the like), as compared to the pre-training workflow discussed above with reference to FIG. 5.

Note that FIG. 6 is just one example of a method, and other methods including fewer, additional, or alternative steps are possible consistent with this disclosure.

Figure 7:
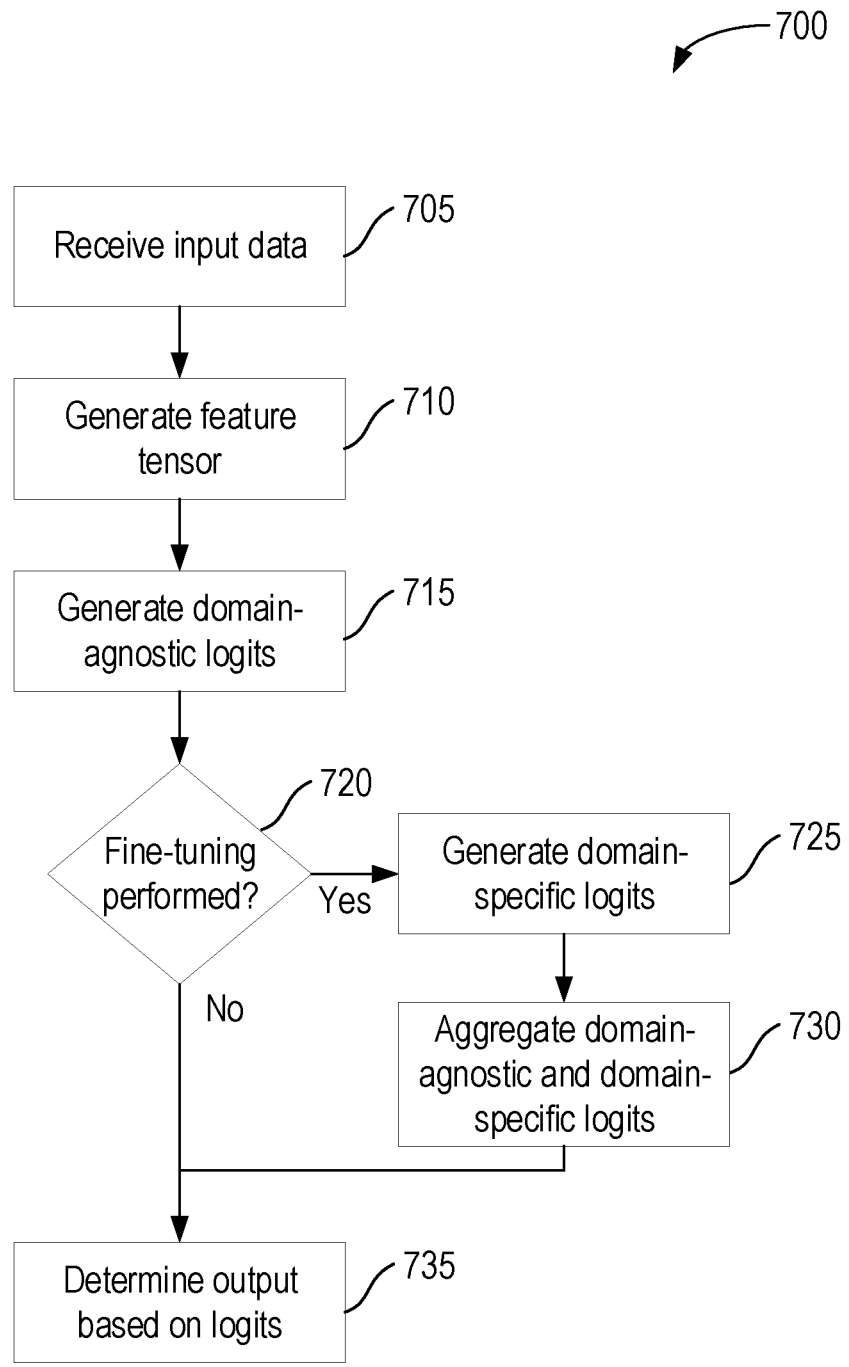
FIG. 7 depicts an example flow diagram illustrating a method for generating an inference using a machine learning model trained for domain adaptation.

Example Method for Generating an Inference using a Machine Learning Model Trained for Domain Adaptation FIG. 7 depicts an example flow diagram illustrating a method 700 for generating an inference using a machine learning model trained for domain adaptation. In some aspects, the method 700 may correspond to the workflow 400 discussed above with reference to FIG. 4.

The method 700 begins at block 705, where a machine learning system receives input data. As discussed above, the input data may generally correspond to data from a target domain, to be used to generate an inference or prediction using a machine learning model for the target domain. For example, the input data may correspond to input 405 of FIG. 4. As the input data is received during runtime or inferencing, it will generally not be associated with a corresponding label.

At block 710, the machine learning system generates a feature tensor based on the received input data. For example, as discussed above, the machine learning system may process the input data using a feature extractor (such as the feature extractor 210 of FIG. 4) to generate a feature tensor representing the input.

At block 715, the machine learning system can then generate a set of domain-agnostic logits using a domain-agnostic classifier. For example, the machine learning system may process the generated feature tensor using one or more layers of a neural network (e.g., corresponding to the domain-agnostic classifier 215 of FIG. 4) to generate a set of logits (e.g., domain-agnostic logits 425 of FIG. 4). Although a classification task is described for conceptual clarity, aspects of the present disclosure can be readily applied to regression tasks as well.

At block 720, the machine learning system can then determine whether fine-tuning was performed. That is, the machine learning system can determine whether the machine learning model was fine-tuned for the target domain (e.g., using the workflow 300 of FIG. 3 and/or the method 600 of FIG. 6) after pre-training, or if the model was pre-trained (e.g., using the workflow 200 of FIG. 2, and/or the method 500 of FIG. 5), but not subsequently fine-tuned. In various aspects, the model may not have been fine-tuned for a variety of reasons, including a lack of fine-tuning data in the target domain. In some aspects, the determination at block 720 comprises determining whether a user or administrator specified to use only the domain-agnostic classifier, or to use both classifiers.

If the machine learning system determines that fine-tuning was not performed (or not yet completed), the method 700 continues to block 735, where the machine learning system determines an output from the model based only on the domain-agnostic logits. That is, if the model has not been fine-tuned, then the machine learning system may refrain from using the domain-specific classifier. As discussed above, in some aspects, determining the output can generally include identifying the class (of the set of output classes) having the largest logit in the domain-agnostic logits.

Returning to block 720, if the machine learning system determines that the model has undergone fine-tuning for the target domain, then the method 700 continues to block 725. At block 725, the machine learning system generates a set of domain-specific logits using a domain-specific classifier. For example, the machine learning system may process the generated feature tensor using one or more layers of a neural network (e.g., corresponding to the domain-specific classifier 320 of FIG. 4) to generate a set of logits (e.g., domain-specific logits 430 of FIG. 4).

At block 730, the machine learning system can then aggregate the domain-agnostic logits and the domain-specific logits, as discussed above (e.g., using a weighted or unweighted summation, using concatenation, using an attention mechanism, and the like). The method 700 then proceeds to block 735, where the machine learning system determines the output of the model based on the aggregated set of logits, as discussed above. For example, the machine learning system may identify the class (of the set of output classes) having the largest logit in the set of aggregated logits.

In at least one aspect, the method 700 can be used to provide online learning or fine-tuning of the machine learning model. For example, the machine learning system may initially use a pre-trained but not fine-tuned model to generate inferences for the target domain (e.g., using the domain-agnostic classifier), and the model can be fine-tuned (e.g., using online learning and/or pseudo-labels) during use. After sufficient fine-tuning, the machine learning system can begin using both the domain-agnostic classifier and the domain-specific classifier to generate output.

Note that FIG. 7 is just one example of a method, and other methods including fewer, additional, or alternative steps are possible consistent with this disclosure.

Example Method for Training a Machine Learning Model

Figure 8:
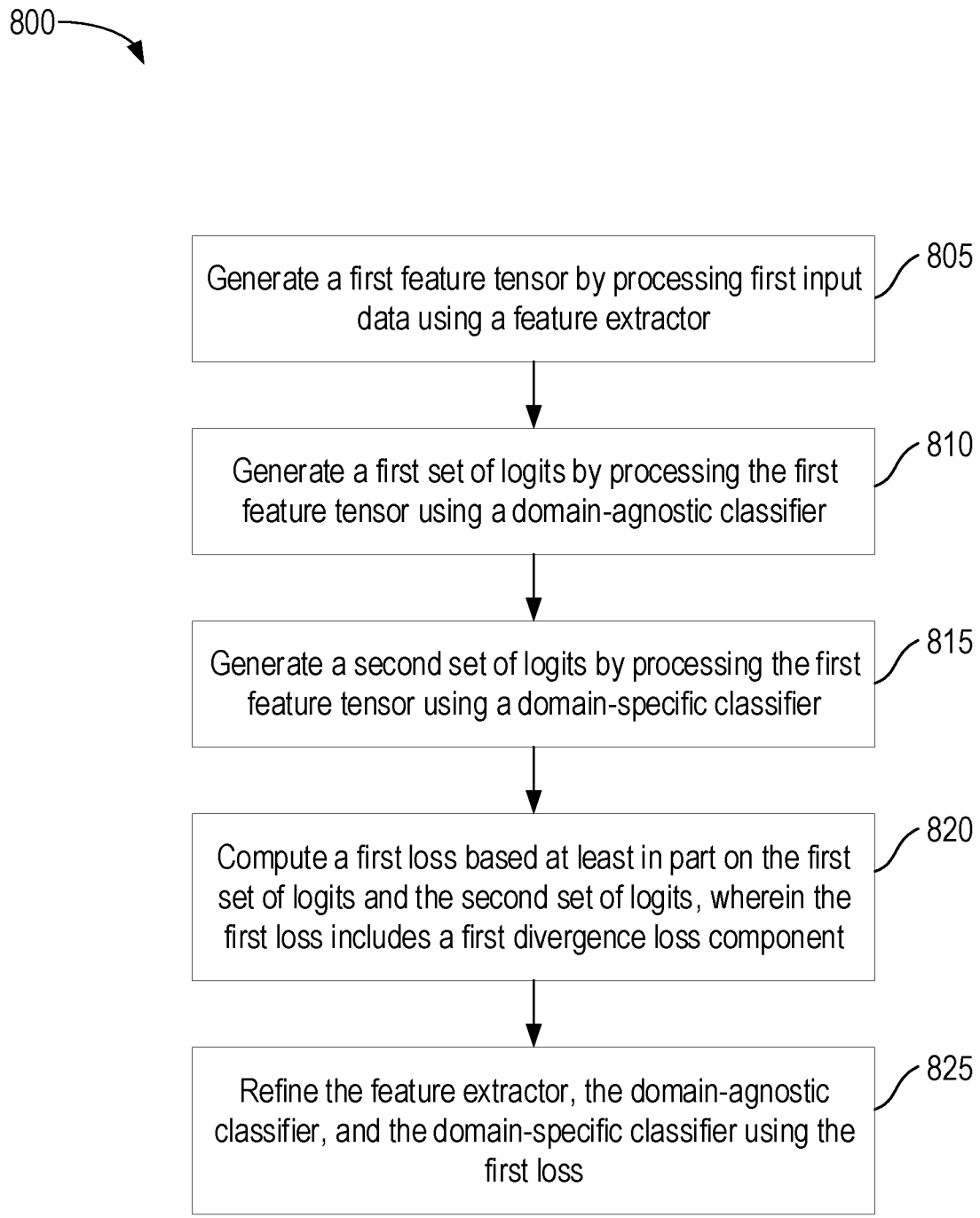
FIG. 8 depicts an example flow diagram illustrating a method for training a machine learning model.

FIG. 8 depicts an example flow diagram illustrating a method for training a machine learning model. In some aspects, the method 800 is performed by a machine learning system.

At block 805, a first feature tensor is generated by processing first input data using a feature extractor.

At block 810, a first set of logits (e.g., domain-agnostic logits 225 of FIG. 2) is generated by processing the first feature tensor using a domain-agnostic classifier.

At block 815, a second set of logits (e.g., domain-specific logits 230 of FIG. 2) is generated by processing the first feature tensor using a domain-specific classifier.

At block 820, a first loss (e.g., training loss 235 of FIG. 2) is computed based at least in part on the first set of logits and the second set of logits, wherein the first loss includes a first divergence loss component.

In some aspects, the first loss further includes a first cross-entropy loss (e.g., a total cross-entropy loss, discussed above with reference to FIG. 2) computed based on an aggregated set of logits including the first set of logits and the second set of logits.

In some aspects, the aggregated set of logits is generated by at least one of: summing the first set of logits and the second set of logits; concatenating the first set of logits and the second set of logits; or combining the first set of logits and the second set of logits using an attention mechanism.

In some aspects, the first loss further includes a second cross-entropy loss (e.g., a domain-agnostic cross-entropy loss, discussed above with reference to FIG. 2) computed based on the first set of logits.

In some aspects, the first loss is defined as: $L_{train}=L_{CE}(z_t, y)+\lambda_a L_{CE}(z_a, y)+\lambda_{ort}L_{ort}$, wherein: $L_{train}$ is the first loss, $L_{CE}(\bullet)$ is a cross-entropy loss function, $z_t$ is the aggregated set of logits, $z_a$ is the first set of logits, y is labels for the first input data, $\lambda_a$ is a weight for the domain-agnostic classifier, $\lambda_{ort}$ is a weight for the first divergence loss component, and $L_{ort}$ is the first divergence loss.

In some aspects, the first divergence loss component comprises an orthonormality loss defined as: $L_{ort}=\Sigma_i \|I-W_i W_i^T\|^2$, wherein: I is an identity matrix, $W_i^T$ is a transposed version of $W_i$, and $W_i=[w_{ai}, w_{si}]$, wherein: $w_{ai}$ is weights of the domain-agnostic classifier for class i, and $w_{si}$ is weights of the domain-specific classifier for class i.

In some aspects, the first divergence loss component comprises an orthonormality loss.

At block 825, the feature extractor, the domain-agnostic classifier, and the domain-specific classifier are refined using the first loss.

In some aspects, the method 800 further comprises: generating a second feature tensor by processing second input data using the feature extractor; generating a third set of logits (e.g., domain-agnostic logits 325 of FIG. 3) by processing the second feature tensor using the domain-agnostic classifier; generating a fourth set of logits (e.g., domain-agnostic logits 330 of FIG. 3) by processing the second feature tensor using the domain-specific classifier; computing a second loss (e.g., refinement loss 335 of FIG. 3) based on the first set of logits and the second set of logits, wherein the first loss includes a second divergence loss component; and fine-tuning at least one of the feature extractor or the domain-specific classifier based on the second loss, wherein the domain-agnostic classifier is fixed during the fine-tuning.

In some aspects, the second loss comprises: a first cross-entropy loss computed based on an aggregated set of logits including the third set of logits and the fourth set of logits; and an orthonormality loss.

In some aspects, the second loss is defined as: $L_{ref}=L_{CE}(z_t, y)+\lambda_{ort}L_{ort}$, wherein: $L_{ref}$ is the second loss, $L_{CE}(\bullet)$ is a cross-entropy loss function, $z_t$ is the aggregated set of logits, y is labels for the second input data, $\lambda_{ort}$ is a weight for the orthonormality loss, and $L_{ort}$ is the orthonormality loss.

In some aspects, the second loss further comprises an information maximization loss.

In some aspects, the second loss is defined as: $L_{ref}=L_{IM}+\lambda_{pse}L_{CE}(z_t, \hat{y})+\lambda_{ort}L_{ort}$, wherein: $L_{ref}$ is the second loss, $L_{IM}$ is the information maximization loss, $\lambda_{pse}$ is a weight for the first cross-entropy loss, $L_{CE}(\bullet)$ is a cross-entropy loss function, $z_t$ is the aggregated set of logits, $\hat{y}$ is pseudo-labels for the second input data, $\lambda_{ort}$ is a weight for the orthonormality loss, and $L_{ort}$ is the orthonormality loss.

In some aspects, the information maximization loss is defined as: $L_{IM}=-E(\Sigma_i p_i \log(p_i))+\Sigma_i \overline{p}_i \log(\overline{p}_i))$, wherein: $E(\bullet)$ is expectation over samples in a batch, $p_i$ is a probability of sample i, and $\overline{p}_i$ is average probability of all samples in the batch.

In some aspects, the pseudo-labels are obtained by: using soft probability outputs as weights to compute a cluster center of each of a plurality of classes; and applying a nearest-neighbor approach to each respective sample in the second input data to identify a respective nearest cluster center, wherein the respective nearest cluster center is used as a respective pseudo-label for the respective sample.

In some aspects, the fine-tuning comprises: upon determining that a number of labeled fine-tuning samples is less than a defined threshold, refining only the domain-specific classifier, wherein the feature extractor is fixed during the fine-tuning.

In some aspects, the fine-tuning comprises: upon determining that only unlabeled fine-tuning samples are available, refining only the domain-specific classifier, wherein the feature extractor is fixed during the fine-tuning.

In some aspects, the second loss comprises a third cross-entropy loss computed based on an aggregated set of logits including the third set of logits and the fourth set of logits.

In some aspects, the method 800 further comprises generating an inference, comprising: generating a second feature tensor by processing new input data using the feature extractor; generating a third set of logits by processing the second feature tensor using the domain-agnostic classifier; generating a fourth set of logits by processing the second feature tensor using the domain-specific classifier; generating an aggregated set of logits based on the third set of logits and the fourth set of logits; and identifying a class with a largest logit in the aggregated set of logits.

Note that FIG. 8 is just one example of a method, and other methods including fewer, additional, or alternative steps are possible consistent with this disclosure.

In some aspects, as discussed above, the feature extractor, domain-agnostic classifier, and/or domain-specific classifier are used to perform user authentication for a target user based on fingerprint data, voice data, or face data.

Example Method for Fine-Tuning a Machine Learning Model

Figure 9:
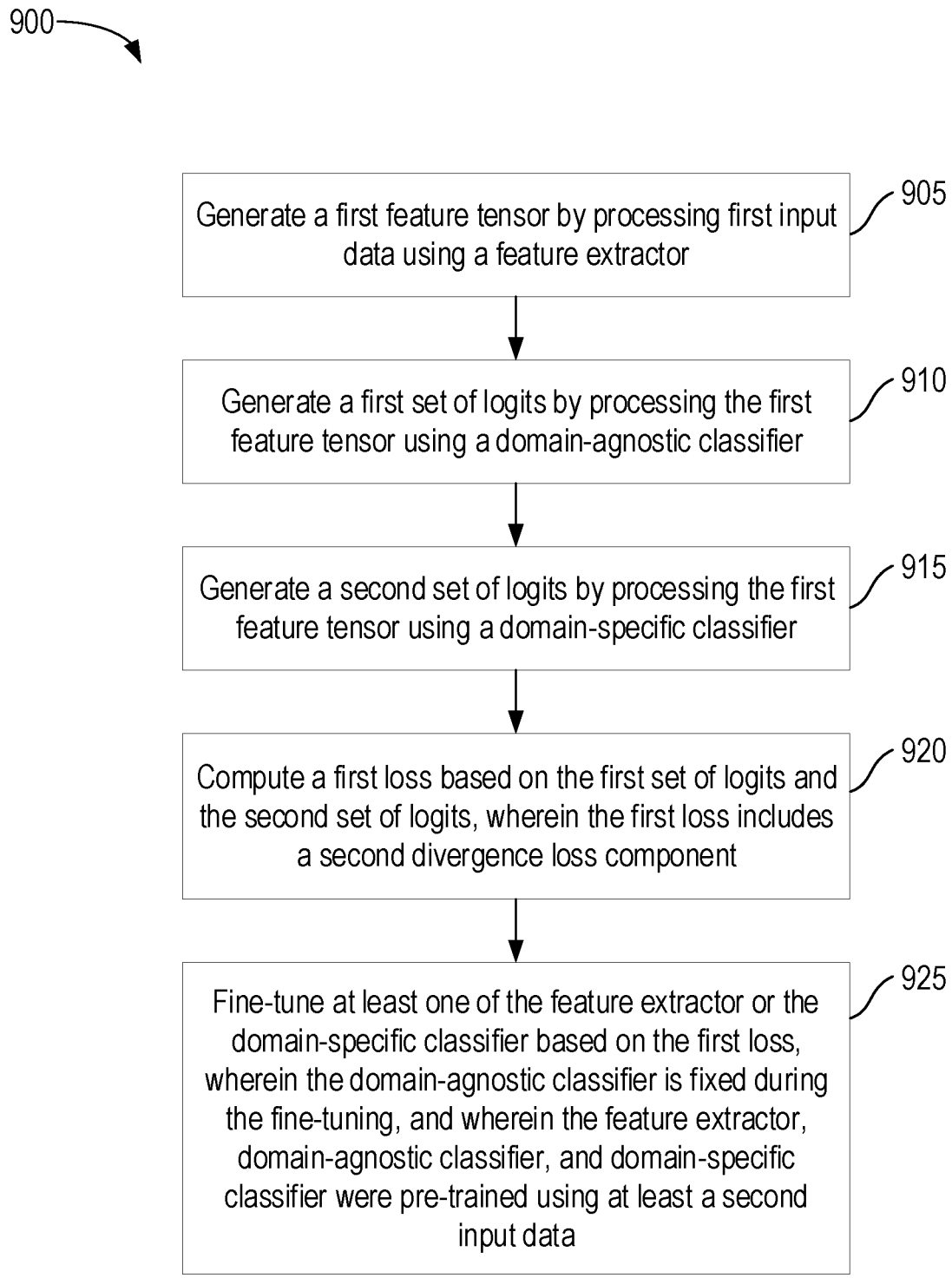
FIG. 9 depicts an example flow diagram illustrating a method for fine-tuning a machine learning model.

FIG. 9 depicts an example flow diagram illustrating a method for fine-tuning a machine learning model.

At block 905, a first feature tensor is generated by processing first input data using a feature extractor.

At block 910, a first set of logits (e.g., domain-agnostic logits 325 of FIG. 3) is generated by processing the first feature tensor using a domain-agnostic classifier.

At block 915, a second set of logits (e.g., domain-specific logits 330 of FIG. 3) is generated by processing the first feature tensor using a domain-specific classifier.

At block 920, a first loss (e.g., refinement loss 335 of FIG. 3) is computed based on the first set of logits and the second set of logits, wherein the first loss includes a second divergence loss component.

At block 925, at least one of the feature extractor or the domain-specific classifier is fine-tuned based on the first loss, wherein the domain-agnostic classifier is fixed during the fine-tuning, and wherein the feature extractor, domain-agnostic classifier, and domain-specific classifier were pre-trained using at least a second input data.

In some aspects, prior to the fine-tuning, the feature extractor, domain-agnostic classifier, and domain-specific classifier were pre-trained by: generating a second feature tensor by processing second input data using the feature extractor; generating a third set of logits by processing the second feature tensor using the domain-agnostic classifier; generating a fourth set of logits by processing the second feature tensor using the domain-specific classifier; computing a second loss based at least in part on the third set of logits and the fourth set of logits, wherein the second loss includes a second divergence loss component; and training the feature extractor, the domain-agnostic classifier, and the domain-specific classifier using the first loss.

In some aspects, the first loss further includes a first cross-entropy loss computed based on an aggregated set of logits including the first set of logits and the second set of logits.

In some aspects, the aggregated set of logits is generated by at least one of: summing the third set of logits and the fourth set of logits; concatenating the third set of logits and the fourth set of logits; or combining the third set of logits and the fourth set of logits using an attention mechanism.

In some aspects, the first divergence loss component comprises an orthonormality loss.

In some aspects, the method 900 further includes, upon determining that the first input data is not associated with a label, generating a pseudo-label for the first input data, wherein the first loss is based at least in part on the pseudo-label.

In some aspects, generating the pseudo label comprises: using soft probability outputs as weights to compute a cluster center of each of a plurality of classes; and applying a nearest-neighbor approach to the first input data to identify a nearest cluster center, wherein the nearest cluster center is used as the pseudo-label for the first input data.

In some aspects, the fine-tuning comprises: upon determining that a number of labeled fine-tuning samples is less than a defined threshold, refining only the domain-specific classifier, wherein the feature extractor is fixed during the fine-tuning.

In some aspects, the fine-tuning comprises: upon determining that only unlabeled fine-tuning samples are available, refining only the domain-specific classifier, wherein the feature extractor is fixed during the fine-tuning.

Note that FIG. 9 is just one example of a method, and other methods including fewer, additional, or alternative steps are possible consistent with this disclosure.

In some aspects, as discussed above, the feature extractor, domain-agnostic classifier, and/or domain-specific classifier are used to perform user authentication for a target user based on fingerprint data, voice data, or face data.

Example Processing System Domain Adaptation

Figure 10:
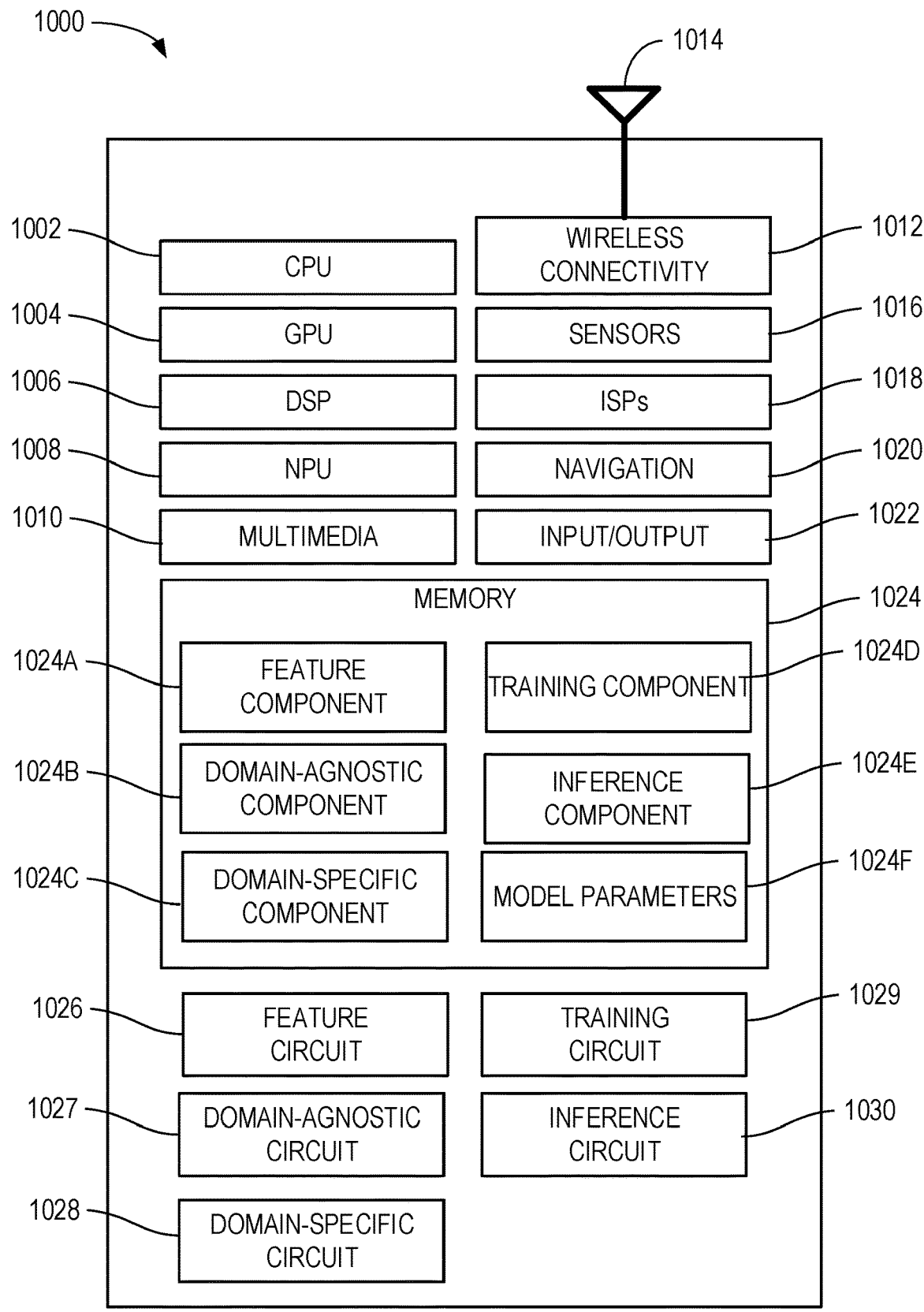
FIG. 10 depicts an example processing system configured to perform various aspects of the present disclosure.

In some aspects, the workflows, techniques, and methods described with reference to FIGS. 1-9 may be implemented on one or more devices or systems. FIG. 10 depicts an example processing system 1000 configured to perform various aspects of the present disclosure, including, for example, the techniques and methods described with respect to FIGS. 1-9. In one aspect, the processing system 1000 may correspond to the machine learning system discussed above.

Processing system 1000 includes a central processing unit (CPU) 1002, which in some examples may be a multi-core CPU. Instructions executed at the CPU 1002 may be loaded, for example, from a program memory associated with the CPU 1002 or may be loaded from a memory partition 1024.

Processing system 1000 also includes additional processing components tailored to specific functions, such as a graphics processing unit (GPU) 1004, a digital signal processor (DSP) 1006, a neural processing unit (NPU) 1008, a multimedia processing unit 1010, and a wireless connectivity component 1012.

An NPU, such as 1008, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 1008, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 1008 is a part of one or more of CPU 1002, GPU 1004, and/or DSP 1006.

In some examples, wireless connectivity component 1012 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 1012 is further connected to one or more antennas 1014.

Processing system 1000 may also include one or more sensor processing units 1016 associated with any manner of sensor, one or more image signal processors (ISPs) 1018 associated with any manner of image sensor, and/or a navigation processor 1020, which may include satellite-based positioning system components (e.g., GPS or GLONASS) as well as inertial positioning system components.

Processing system 1000 may also include one or more input and/or output devices 1022, such as screens, touch-sensitive surfaces (including touch-sensitive displays), physical buttons, speakers, microphones, and the like.

In some examples, one or more of the processors of processing system 1000 may be based on an ARM or RISC-V instruction set.

Processing system 1000 also includes memory 1024, which is representative of one or more static and/or dynamic memories, such as a dynamic random access memory, a flash-based static memory, and the like. In this example, memory 1024 includes computer-executable components, which may be executed by one or more of the aforementioned processors of processing system 1000.

In particular, in this example, memory 1024 includes a feature component 1024A (which may correspond to the feature extractor 210 in FIGS. 2-4), a domain-agnostic component 1024B (which may correspond to the domain-agnostic classifier 215 in FIG. 2, and/or the domain-agnostic classifier 315 in FIGS. 3-4), a domain-specific component 1024C (which may correspond to the domain-specific classifier 220 in FIG. 2, and/or the domain-specific classifier 320 in FIGS. 3-4), a training component 1024D, and an inference component 1024E. The memory 1024 also includes a set of model parameters 1024F (which may correspond to the parameters of the machine learning models discussed above, including the weights and biases of the feature extractor(s), domain-agnostic classifier(s), and domain-specific classifier(s)). The depicted components, and others not depicted, may be configured to perform various aspects of the techniques described herein. Though depicted as discrete components for conceptual clarity in FIG. 10, feature component 1024A, domain-agnostic component 1024B, domain-specific component 1024C, training component 1024D, and inference component 1024E may be collectively or individually implemented in various aspects.

Processing system 1000 further comprises feature circuit 1026, domain-agnostic circuit 1027, domain-specific circuit 1028, training circuit 1029, and inference circuit 1030. The depicted circuits, and others not depicted, may be configured to perform various aspects of the techniques described herein.

For example, feature component 1024A and feature circuit 1026 may be used to extract the features of the input images (e.g., using a one or more layers of a neural network). Domain-agnostic component 1024B and domain-agnostic circuit 1027 may be used to generate domain-agnostic logits (e.g., domain-agnostic logits 225 in FIG. 2, domain-agnostic logits 325 in FIG. 3, and/or domain-agnostic logits 425 in FIG. 4) based on input feature tensors, as discussed above. Domain-specific component 1024C and domain-specific circuit 1028 may be used to may be used to generate domain-specific logits (e.g., domain-specific logits 230 in FIG. 2, domain-specific logits 330 in FIG. 3, and/or domain-specific logits 430 in FIG. 4) based on input feature tensors, as discussed above. Training component 1024D and training circuit 1029 may be used to train, refine, and/or fine-tune the models (e.g., using the workflow 200 in FIG. 2, the workflow 300 in FIG. 3, the method 500 in FIG. 5, the method 600 in FIG. 6, the method 800 in FIG. 8, and/or the method 900 in FIG. 9), as discussed above. Inference component 1024E and inference circuit 1030 may be used to generate inferences or predictions using domain-adapted models based on input data (e.g., using the workflow 400 in FIG. 4, the method 700 in FIG. 7, and/or the method 600 in FIG. 6), as discussed above.

Though depicted as separate components and circuits for clarity in FIG. 10, feature circuit 1026, domain-agnostic circuit 1027, domain-specific circuit 1028, training circuit 1029, and inference circuit 1030 may collectively or individually be implemented in other processing devices of processing system 1000, such as within CPU 1002, GPU 1004, DSP 1006, NPU 1008, and the like.

Generally, processing system 1000 and/or components thereof may be configured to perform the methods described herein.

Notably, in other aspects, aspects of processing system 1000 may be omitted, such as where processing system 1000 is a server computer or the like. For example, multimedia component 1010, wireless connectivity 1012, sensors 1016, ISPs 1018, and/or navigation component 1020 may be omitted in other aspects. Further, aspects of processing system 1000 maybe distributed between multiple devices.

Example Clauses

Clause 1: A method, comprising: generating a first feature tensor by processing first input data using a feature extractor; generating a first set of logits by processing the first feature tensor using a domain-agnostic classifier; generating a second set of logits by processing the first feature tensor using a domain-specific classifier; computing a first loss based at least in part on the first set of logits and the second set of logits, wherein the first loss includes a first divergence loss component; and refining the feature extractor, the domain-agnostic classifier, and the domain-specific classifier using the first loss.

Clause 2: The method according to Clause 1, wherein the first loss further includes a first cross-entropy loss computed based on an aggregated set of logits including the first set of logits and the second set of logits.

Clause 3: The method according to any one of Clauses 1-2, wherein the aggregated set of logits is generated by at least one of: summing the first set of logits and the second set of logits; concatenating the first set of logits and the second set of logits; or combining the first set of logits and the second set of logits using an attention mechanism.

Clause 4: The method according to any one of Clauses 1-3, wherein the first loss further includes a second cross-entropy loss computed based on the first set of logits.

Clause 5: The method according to any one of Clauses 1-4, wherein the first loss is defined as: $L_{train}=L_{CE}(z_t, y)+\lambda_a L_{CE}(z_a, y)+\lambda_{ort}L_{ort}$, wherein: $L_{train}$ is the first loss, $L_{CE}(\bullet)$ is a cross-entropy loss function, $z_t$ is the aggregated set of logits, $z_a$ is the first set of logits, y is labels for the first input data, $\lambda_a$ is a weight for the domain-agnostic classifier, $\lambda_{ort}$ is a weight for the first divergence loss component, and $L_{ort}$ is the first divergence loss.

Clause 6: The method according to any one of Clauses 1-5, wherein the first divergence loss component comprises an orthonormality loss defined as: $L_{ort}=\Sigma_i\|I-W_iW_i^T\|^2$, wherein: I is an identity matrix, $W_i^T$ is a transposed version of $W_i$, and $W_i=[w_{ai}, w_{si}]$, wherein: $w_{ai}$ is weights of the domain-agnostic classifier for class i, and $w_{si}$ is weights of the domain-specific classifier for class i.

Clause 7: The method according to any one of Clauses 1-6, wherein the first divergence loss component comprises an orthonormality loss.

Clause 8: The method according to any one of Clauses 1-7, further comprising: generating a second feature tensor by processing second input data using the feature extractor; generating a third set of logits by processing the second feature tensor using the domain-agnostic classifier; generating a fourth set of logits by processing the second feature tensor using the domain-specific classifier; computing a second loss based on the first set of logits and the second set of logits, wherein the first loss includes a second divergence loss component; and fine-tuning at least one of the feature extractor or the domain-specific classifier based on the second loss, wherein the domain-agnostic classifier is fixed during the fine-tuning.

Clause 9: The method according to any one of Clauses 1-8, wherein the second loss comprises: a first cross-entropy loss computed based on an aggregated set of logits including the third set of logits and the fourth set of logits; and an orthonormality loss.

Clause 10: The method according to any one of Clauses 1-9, wherein the second loss is defined as: $L_{ref}=L_{CE}(z_t, y)+\lambda_{ort}L_{ort}$, wherein: $L_{ref}$ is the second loss, $L_{CE}(\bullet)$ is a cross-entropy loss function, $z_t$ is the aggregated set of logits, y is labels for the second input data, $\lambda_{ort}$ is a weight for the orthonormality loss, and $L_{ort}$ is the orthonormality loss.

Clause 11: The method according to any one of Clauses 1-10, wherein the second loss further comprises an information maximization loss.

Clause 12: The method according to any one of Clauses 1-11, wherein the second loss is defined as: $L_{ref}=L_{IM}+\lambda_{pse}L_{CE}(z_t, \hat{y})+\lambda_{ort}L_{ort}$, wherein: $L_{ref}$ is the second loss, $L_{IM}$ is the information maximization loss, $\lambda_{pse}$ is a weight for the first cross-entropy loss, $L_{CE}(\bullet)$ is a cross-entropy loss function, $z_t$ is the aggregated set of logits, $\hat{y}$ is pseudo-labels for the second input data, $\lambda_{ort}$ is a weight for the orthonormality loss, and $L_{ort}$ is the orthonormality loss.

Clause 13: The method according to any one of Clauses 1-12, wherein the information maximization loss is defined as: $L_{IM}=-E(\Sigma_i p_i \log(p_i))+\Sigma_i \bar{p}_i \log(\bar{p}_i))$, wherein: $E(\bullet)$ is expectation over samples in a batch, $p_i$ is a probability of sample i, and $\bar{p}_i$ is average probability of all samples in the batch Clause 14: The method according to any one of Clauses 1-13, rein the pseudo-labels are obtained by: using soft probability outputs as weights to compute a cluster center of each of a plurality of classes; and applying a nearest-neighbor approach to each respective sample in the second input data to identify a respective nearest cluster center, wherein the respective nearest cluster center is used as a respective pseudo-label for the respective sample.

Clause 15: The method according to any one of Clauses 1-14, wherein the fine-tuning comprises: upon determining that a number of labeled fine-tuning samples is less than a defined threshold, refining only the domain-specific classifier, wherein the feature extractor is fixed during the fine-tuning.

Clause 16: The method according to any one of Clauses 1-15, wherein the fine-tuning comprises: upon determining that only unlabeled fine-tuning samples are available, refining only the domain-specific classifier, wherein the feature extractor is fixed during the fine-tuning.

Clause 17: The method according to any one of Clauses 1-16, wherein the second loss comprises a third cross-entropy loss computed based on an aggregated set of logits including the third set of logits and the fourth set of logits.

Clause 18: The method according to any one of Clauses 1-17, further comprising generating an inference, comprising: generating a second feature tensor by processing new input data using the feature extractor; generating a third set of logits by processing the second feature tensor using the domain-agnostic classifier; generating a fourth set of logits by processing the second feature tensor using the domain-specific classifier; generating an aggregated set of logits based on the third set of logits and the fourth set of logits; and identifying a class with a largest logit in the aggregated set of logits.

Clause 19: The method according to any one of Clauses 1-18, wherein the first input data corresponds to a source domain, the method further comprising fine-tuning at least one of the feature extractor or the domain-specific classifier for a target domain, wherein the domain-agnostic classifier is fixed during the fine-tuning.

Clause 20: The method according to any one of Clauses 1-19, wherein the fine-tuning is performed as part of an enrollment process for a new user.

Clause 21: The method according to any one of Clauses 1-20, wherein the source domain comprises biometric authentication for a first set of one or more users, and the target domain comprises biometric authentication for the new user.

Clause 22: The method according to any one of Clauses 1-21, wherein the source domain comprises voice verification for a first set of one or more users, and the target domain comprises voice verification for the new user.

Clause 23: The method according to any one of Clauses 1-22, wherein the source domain comprises attention verification for a first set of one or more users, and the target domain comprises attention verification for the new user.

Clause 24: A method, comprising: generating a first feature tensor by processing first input data using a feature extractor; generating a first set of logits by processing the first feature tensor using a domain-agnostic classifier; generating a second set of logits by processing the first feature tensor using a domain-specific classifier; computing a first loss based on the first set of logits and the second set of logits, wherein the first loss includes a second divergence loss component; and fine-tuning at least one of the feature extractor or the domain-specific classifier based on the first loss, wherein the domain-agnostic classifier is fixed during the fine-tuning, and wherein the feature extractor, domain-agnostic classifier, and domain-specific classifier were pre-trained using at least a second input data.

Clause 25: The method according to Clause 24, wherein, prior to the fine-tuning, the feature extractor, domain-agnostic classifier, and domain-specific classifier were pre-trained by: generating a second feature tensor by processing second input data using the feature extractor; generating a third set of logits by processing the second feature tensor using the domain-agnostic classifier; generating a fourth set of logits by processing the second feature tensor using the domain-specific classifier; computing a second loss based at least in part on the third set of logits and the fourth set of logits, wherein the second loss includes a second divergence loss component; and training the feature extractor, the domain-agnostic classifier, and the domain-specific classifier using the first loss.

Clause 26: The method according to any one of Clauses 24-25, wherein the first loss further includes a first cross-entropy loss computed based on an aggregated set of logits including the first set of logits and the second set of logits.

Clause 27: The method according to any one of Clauses 24-26, wherein the aggregated set of logits is generated by at least one of: summing the third set of logits and the fourth set of logits; concatenating the third set of logits and the fourth set of logits; or combining the third set of logits and the fourth set of logits using an attention mechanism.

Clause 28: The method according to any one of Clauses 24-27, wherein the first divergence loss component comprises an orthonormality loss.

Clause 29: The method according to any one of Clauses 24-28, further comprising: upon determining that the first input data is not associated with a label, generating a pseudo-label for the first input data, wherein the first loss is based at least in part on the pseudo-label.

Clause 30: The method according to any one of Clauses 24-29, wherein generating the pseudo label comprises: using soft probability outputs as weights to compute a cluster center of each of a plurality of classes; and applying a nearest-neighbor approach to the first input data to identify a nearest cluster center, wherein the nearest cluster center is used as the pseudo-label for the first input data.

Clause 31: The method according to any one of Clauses 24-30, wherein the fine-tuning comprises: upon determining that a number of labeled fine-tuning samples is less than a defined threshold, refining only the domain-specific classifier, wherein the feature extractor is fixed during the fine-tuning.

Clause 32: The method according to any one of Clauses 24-31, wherein the fine-tuning comprises: upon determining that only unlabeled fine-tuning samples are available, refining only the domain-specific classifier, wherein the feature extractor is fixed during the fine-tuning.

Clause 33: A system, comprising: a memory comprising computer-executable instructions; and one or more processors configured to execute the computer-executable instructions and cause the processing system to perform a method in accordance with any one of Clauses 1-32.

Clause 34: A system, comprising means for performing a method in accordance with any one of Clauses 1-32.

Clause 35: A non-transitory computer-readable medium comprising computer-executable instructions that, when executed by one or more processors of a processing system, cause the processing system to perform a method in accordance with any one of Clauses 1-32.

Clause 36: A computer program product embodied on a computer-readable storage medium comprising code for performing a method in accordance with any one of Clauses 1-32.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s)

and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
receiving first input data;
generating a first feature tensor by processing the first input data using a feature extractor;
generating a first set of logits by processing the first feature tensor using a domain-agnostic classifier;
generating a second set of logits by processing the first feature tensor using a domain-specific classifier;
computing a first loss based at least in part on the first set of logits and the second set of logits, wherein the first loss includes a first divergence loss component;
refining the feature extractor, the domain-agnostic classifier, and the domain-specific classifier using the first loss;
generating a second feature tensor by processing second input data using the feature extractor;
generating a third set of logits by processing the second feature tensor using the domain-agnostic classifier;
generating a fourth set of logits by processing the second feature tensor using the domain-specific classifier;
computing a second loss based on the third set of logits and the fourth set of logits, wherein the second loss includes a second divergence loss component; and
fine-tuning at least one of the feature extractor or the domain-specific classifier based on the second loss, wherein the domain-agnostic classifier is fixed during the fine-tuning, wherein the fine-tuning comprises at least one of:
upon determining that a number of labeled fine-tuning samples is less than a defined threshold, refining only the domain-specific classifier, wherein the feature extractor is fixed during the fine-tuning; and
upon determining that only unlabeled fine-tuning samples are available, refining only the domain-specific classifier, wherein the feature extractor is fixed during the fine-tuning.

2. The method of claim 1, wherein the first loss further includes a first cross-entropy loss computed based on an aggregated set of logits including the first set of logits and the second set of logits.

3. The method of claim 2, wherein the aggregated set of logits is generated by at least one of:

summing the first set of logits and the second set of logits;
concatenating the first set of logits and the second set of logits; or
combining the first set of logits and the second set of logits using an attention mechanism.

4. The method of claim 2, wherein the first loss further includes a second cross-entropy loss computed based on the first set of logits.

5. The method of claim 1, wherein the first input data corresponds to a source domain, the method further comprising fine-tuning at least one of the feature extractor or the domain-specific classifier for a target domain, wherein the domain-agnostic classifier is fixed during the fine-tuning.

6. The method of claim 5, wherein the fine-tuning is performed as part of an enrollment process for a new user.

7. The method of claim 6, wherein:
the source domain comprises biometric authentication for a first set of one or more users, and
the target domain comprises biometric authentication for the new user.

8. The method of claim 6, wherein:
the source domain comprises voice verification for a first set of one or more users, and
the target domain comprises voice verification for the new user.

9. The method of claim 6, wherein:
the source domain comprises attention verification for a first set of one or more users, and
the target domain comprises attention verification for the new user.

10. The method of claim 1, wherein the first divergence loss component comprises an orthonormality loss.

11. The method of claim 1, wherein the second loss comprises:
a first cross-entropy loss computed based on an aggregated set of logits including the third set of logits and the fourth set of logits; and
an orthonormality loss.

12. The method of claim 11, wherein the second loss further comprises an information maximization loss.

13. The method of claim 12, wherein the information maximization loss is defined based at least in part on pseudo labels for the second input data, and wherein the pseudo-labels are obtained by:
using soft probability outputs as weights to compute a cluster center of each of a plurality of classes; and
applying a nearest-neighbor approach to each respective sample in the second input data to identify a respective nearest cluster center, wherein the respective nearest cluster center is used as a respective pseudo-label for the respective sample.

14. The method of claim 1, wherein the second loss comprises a third cross-entropy loss computed based on an aggregated set of logits including the third set of logits and the fourth set of logits.

15. The method of claim 1, further comprising generating an inference, comprising:
generating an aggregated set of logits based on the third set of logits and the fourth set of logits; and
identifying a class with a largest logit in the aggregated set of logits.

16. A method, comprising:
generating a first feature tensor by processing first input data using a feature extractor;
generating a first set of logits by processing the first feature tensor using a domain-agnostic classifier;

generating a second set of logits by processing the first feature tensor using a domain-specific classifier;
computing a first loss based on the first set of logits and the second set of logits, wherein the first loss includes a first divergence loss component; and
fine-tuning at least one of the feature extractor or the domain-specific classifier based on the first loss, wherein the domain-agnostic classifier is fixed during the fine-tuning, and wherein the feature extractor, domain-agnostic classifier, and domain-specific classifier were pre-trained using at least a second input data, wherein the fine-tuning comprises at least one of:
upon determining that a number of labeled fine-tuning samples is less than a defined threshold, refining only the domain-specific classifier, wherein the feature extractor is fixed during the fine-tuning; and
upon determining that only unlabeled fine-tuning samples are available, refining only the domain-specific classifier, wherein the feature extractor is fixed during the fine-tuning.

17. The method of claim 16, wherein, prior to the fine-tuning, the feature extractor, domain-agnostic classifier, and domain-specific classifier were pre-trained by:
generating a second feature tensor by processing the second input data using the feature extractor;
generating a third set of logits by processing the second feature tensor using the domain-agnostic classifier;
generating a fourth set of logits by processing the second feature tensor using the domain-specific classifier;
computing a second loss based at least in part on the third set of logits and the fourth set of logits, wherein the second loss includes a second divergence loss component; and
training the feature extractor, the domain-agnostic classifier, and the domain-specific classifier using the first loss.

18. The method of claim 16, wherein the first loss further includes a first cross-entropy loss computed based on an aggregated set of logits including the first set of logits and the second set of logits.

19. The method of claim 18, wherein the aggregated set of logits is generated by at least one of:
summing the first set of logits and the second set of logits;
concatenating the first set of logits and the second set of logits; or
combining the first set of logits and the second set of logits using an attention mechanism.

20. The method of claim 16, wherein the first divergence loss component comprises an orthonormality loss.

21. The method of claim 16, further comprising: upon determining that the first input data is not associated with a label, generating a pseudo-label for the first input data, wherein the first loss is based at least in part on the pseudo-label.

22. The method of claim 21, wherein generating the pseudo label comprises:
using soft probability outputs as weights to compute a cluster center of each of a plurality of classes; and
applying a nearest-neighbor approach to the first input data to identify a nearest cluster center, wherein the nearest cluster center is used as the pseudo-label for the first input data.

23. A system, comprising:
a memory comprising computer-executable instructions; and
one or more processors configured to execute the computer-executable instructions and cause the system to perform an operation comprising:
generating a first feature tensor by processing first input data using a feature extractor;
generating a first set of logits by processing the first feature tensor using a domain-agnostic classifier;
generating a second set of logits by processing the first feature tensor using a domain-specific classifier;
computing a first loss based at least in part on the first set of logits and the second set of logits, wherein the first loss includes a first divergence loss component;
refining the feature extractor, the domain-agnostic classifier, and the domain-specific classifier using the first loss;
generating a second feature tensor by processing second input data using the feature extractor;
generating a third set of logits by processing the second feature tensor using the domain-agnostic classifier;
generating a fourth set of logits by processing the second feature tensor using the domain-specific classifier;
computing a second loss based on the third set of logits and the fourth set of logits, wherein the second loss includes a second divergence loss component; and
fine-tuning at least one of the feature extractor or the domain-specific classifier based on the second loss, wherein the domain-agnostic classifier is fixed during the fine-tuning, wherein the fine-tuning comprises at least one of:
upon determining that a number of labeled fine-tuning samples is less than a defined threshold, refining only the domain-specific classifier, wherein the feature extractor is fixed during the fine-tuning; and
upon determining that only unlabeled fine-tuning samples are available, refining only the domain-specific classifier, wherein the feature extractor is fixed during the fine-tuning.

24. A system, comprising:
means for generating a first feature tensor by processing first input data using a feature extractor;
means for generating a first set of logits by processing the first feature tensor using a domain-agnostic classifier;
means for generating a second set of logits by processing the first feature tensor using a domain-specific classifier;
means for computing a first loss based at least in part on the first set of logits and the second set of logits, wherein the first loss includes a first divergence loss component;
means for refining the feature extractor, the domain-agnostic classifier, and the domain-specific classifier using the first loss;
means for generating a second feature tensor by processing second input data using the feature extractor;
means for generating a third set of logits by processing the second feature tensor using the domain-agnostic classifier;
means for generating a fourth set of logits by processing the second feature tensor using the domain-specific classifier;
means for computing a second loss based on the third set of logits and the fourth set of logits, wherein the second loss includes a second divergence loss component; and
means for fine-tuning at least one of the feature extractor or the domain-specific classifier based on the second loss, wherein the domain-agnostic classifier is fixed during the fine-tuning, wherein the means for fine-tuning is configured to at least one of:
- upon determining that a number of labeled fine-tuning samples is less than a defined threshold, refine only the domain-specific classifier, wherein the feature extractor is fixed during the fine-tuning; and
- upon determining that only unlabeled fine-tuning samples are available, refine only the domain-specific classifier, wherein the feature extractor is fixed during the fine-tuning.

\* \* \* \* \*